US012382506B2

(12) United States Patent
Zhou et al.

(10) Patent No.: US 12,382,506 B2
(45) Date of Patent: Aug. 5, 2025

(54) RANDOM ACCESS CHANNEL OCCASIONS AND RESOURCES FOR INTERFERENCE MITIGATION

(71) Applicant: QUALCOMM Incorporated, San Diego, CA (US)

(72) Inventors: Yan Zhou, San Diego, CA (US); Qian Zhang, Basking Ridge, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 558 days.

(21) Appl. No.: 17/570,881

(22) Filed: Jan. 7, 2022

(65) Prior Publication Data

US 2023/0224976 A1 Jul. 13, 2023

(51) Int. Cl.
*H04W 74/0833* (2024.01)
*H04B 17/318* (2015.01)
(Continued)

(52) U.S. Cl.
CPC ...... *H04W 74/0841* (2013.01); *H04B 17/318* (2015.01); *H04B 17/336* (2015.01);
(Continued)

(58) Field of Classification Search
CPC ............ H04W 74/0841; H04W 24/10; H04W 72/0446; H04W 72/0453; H04W 74/0866;
(Continued)

(56) References Cited

U.S. PATENT DOCUMENTS 10,644,845 B2 * 5/2020 Yang ............... H04L 5/0053
11,233,623 B2 * 1/2022 Xu ............... H04B 17/336
(Continued)

FOREIGN PATENT DOCUMENTS

WO  WO-2021203282 A1  10/2021
WO  WO-2021223089 A1  11/2021
WO  WO-2021248397 A1  12/2021

OTHER PUBLICATIONS

International Search Report and Written Opinion—PCT/US2022/081206—ISA/EPO—Mar. 28, 2023 (2107599WO).
(Continued)

*Primary Examiner* — Brian T O Connor
(74) *Attorney, Agent, or Firm* — Holland & Hart/QUALCOMM Incorporated

(57) ABSTRACT

Methods, systems, and devices for wireless communication are described. A communication device may receive control signaling indicating a first set of resources for random access channel (RACH) occasions (ROs) and a second set of resources for communicating one or more indications of interference (e.g., crosslink interference (CLI)) associated with the ROs. The communication device may receive a reference signal (e.g., a sounding reference signal (SRS)) over at least one resource of the second set of resources. The communication device may perform a RACH procedure during an RO. The RO may be associated with the at least one resource and may be based on a signal parameter associated with the received reference signal satisfying a threshold (e.g., reference signal strength indicator (RSSI)).

32 Claims, 17 Drawing Sheets

(51) Int. Cl.
*H04B 17/336* (2015.01)
*H04W 24/10* (2009.01)
*H04W 72/0446* (2023.01)
*H04W 72/0453* (2023.01)
*H04W 74/08* (2024.01)

(52) U.S. Cl.
CPC ....... *H04W 24/10* (2013.01); *H04W 72/0446* (2013.01); *H04W 72/0453* (2013.01); *H04W 74/0866* (2013.01)

(58) Field of Classification Search
CPC ............. H04W 74/0833; H04B 17/318; H04B 17/336
See application file for complete search history.

(56) References Cited

U.S. PATENT DOCUMENTS

| | | | | |
|---|---|---|---|---|
| 2017/0303144 A1* | 10/2017 | Guo | ............... | H04B 17/318 |
| 2018/0323916 A1* | 11/2018 | Yang | ............... | H04L 5/0053 |
| 2021/0112503 A1* | 4/2021 | Zhang | ............... | H04W 24/08 |
| 2021/0345141 A1* | 11/2021 | Cao | ............... | H04L 5/0023 |
| 2023/0189315 A1* | 6/2023 | Haustein | ............... | H04W 24/02 |
| | | | | 370/252 |
| 2023/0189382 A1* | 6/2023 | Haustein | ............... | H04W 76/20 |
| | | | | 370/329 |
| 2024/0049028 A1* | 2/2024 | Wang | ............... | H04W 8/005 |

OTHER PUBLICATIONS

3GPP TS 38.213: "3rd Generation Partnership Project, Technical Specification Group Radio Access Network, NR, Study on Physical Layer Procedures for Control (Release 17)", 3GPP TS 38.213 V17.0.0, Dec. 2021, Section 14, pp. 1-6, 186-190.
3GPP RWS-210659, Ran Chair: "Summary of RAN Rel-18 Workshop", 3GPP RWS-210659, Jul. 2, 2021, pp. 1-16.

* cited by examiner

RANDOM ACCESS CHANNEL OCCASIONS AND RESOURCES FOR INTERFERENCE MITIGATION

INTRODUCTION

The following relates to wireless communication, including managing interference for the wireless communication.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long-Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

SUMMARY

A method for wireless communication at a first UE is described. The method may include receiving control signaling indicating a first set of resources for random access channel occasions (ROs) and a second set of resources for communicating one or more indications of interference associated with the ROs, receiving, from a second UE, a reference signal over at least one resource of the second set of resources, and performing a random access channel (RACH) procedure during a RO, the RO associated with the at least one resource and is based on a signal parameter associated with the received reference signal satisfying a threshold.

An apparatus for wireless communication is described. The apparatus may include a processor, memory coupled to the processor, the processor and memory configured to receive control signaling indicating a first set of resources for ROs and a second set of resources for communicating one or more indications of interference associated with the ROs, receive, from a second apparatus, a reference signal over at least one resource of the second set of resources, and perform a RACH procedure during a RO, the RO associated with the at least one resource and is based on a signal parameter associated with the received reference signal satisfying a threshold.

Another apparatus for wireless communication is described. The apparatus may include means for receiving control signaling indicating a first set of resources for ROs and a second set of resources for communicating one or more indications of interference associated with the ROs, means for receiving, from a second apparatus, a reference signal over at least one resource of the second set of resources, and means for performing a RACH procedure during a RO, the RO associated with the at least one resource and is based on a signal parameter associated with the received reference signal satisfying a threshold.

A non-transitory computer-readable medium storing code for wireless communication at a first UE is described. The code may include instructions executable by a processor to receive control signaling indicating a first set of resources for ROs and a second set of resources for communicating one or more indications of interference associated with the ROs, receive, from a second UE, a reference signal over at least one resource of the second set of resources, and perform a RACH procedure during a RO, the RO associated with the at least one resource and is based on a signal parameter associated with the received reference signal satisfying a threshold.

In some examples of the method, apparatuses, and non-transitory computer-readable medium described herein, receiving the control signaling may include operations, features, means, or instructions for receiving the control signaling indicating the first set of resources for the ROs being based on a connected mode of the first UE.

In some examples of the method, apparatuses, and non-transitory computer-readable medium described herein, receiving the reference signal may include operations, features, means, or instructions for receiving a sounding reference signal (SRS) over the at least one resource of the second set of resources for cross-link interference (CLI) measurement.

Some examples of the method, apparatuses, and non-transitory computer-readable medium described herein may further include operations, features, means, or instructions for determining a received signal strength indicator (RSSI) based on the received SRS over the at least one resource of the second set of resources for the CLI measurement, determining whether to use the RO associated with the at least one resource of the second set of resources for the CLI measurement based on the RSSI satisfying the threshold, and where performing the RACH procedure may be further based on determining whether to use the RO.

In some examples of the method, apparatuses, and non-transitory computer-readable medium described herein, receiving the reference signal may include operations, features, means, or instructions for receiving the reference signal on each of the second set of resources for communicating the one or more indications of interference, each RO corresponding to a resource of the second set of resources for CLI measurement on each of one or more beams associated with each of one or more ROs, the method further including, determining a signal strength associated with the received reference signal on each of the second set of resources for CLI measurement, and transmitting a report indicating the signal strength associated with the received reference signal on each of the second set of resources for the CLI measurement.

Some examples of the method, apparatuses, and non-transitory computer-readable medium described herein may further include operations, features, means, or instructions for receiving an indication of the RO to use for the RACH procedure based on transmitting the report and selecting the RO based on the received indication of the RO.

In some examples of the method, apparatuses, and non-transitory computer-readable medium described herein, the report indicates an availability of one or more ROs for the RACH procedure based on the signal strength associated with the received reference signal on each of the second set of resources for the CLI measurement.

Some examples of the method, apparatuses, and non-transitory computer-readable medium described herein may further include operations, features, means, or instructions for receiving second control signaling indicating a change to a different resource of each of first set of resources for the ROs in a time domain or a frequency domain, or both, based on the report and where performing the RACH procedure may be further based on the received second control signaling.

In some examples of the method, apparatuses, and non-transitory computer-readable medium described herein, the control signaling includes a bitmap identifying one or more of the ROs to use for the RACH procedure.

In some examples of the method, apparatuses, and non-transitory computer-readable medium described herein, the control signaling includes a radio resource control (RRC) message, a medium access control-control element (MAC-CE), or a downlink control information (DCI).

In some examples of the method, apparatuses, and non-transitory computer-readable medium described herein, each RO corresponding to a resource of the second set of resources for CLI measurement on a beam associated with each RO.

In some examples of the method, apparatuses, and non-transitory computer-readable medium described herein, the first set of resources of the ROs overlaps with a third set of resources for downlink communications with the second UE and the first set of resources for the ROs may be full duplexed with the third set of resources for the downlink communications.

A method for wireless communication at a base station is described. The method may include transmitting, control signaling indicating a first set of resources for ROs and a second set of resources for communicating one or more indications of interference associated with the ROs, the first set of resources of the ROs overlapping with a third set of resources for downlink communications and performing a RACH procedure during a RO of the ROs that are fully duplexed with the third set of resources for the downlink communications.

An apparatus for wireless communication is described. The apparatus may include a processor, memory coupled to the processor, the processor and memory configured to transmit, control signaling indicating a first set of resources for ROs and a second set of resources for communicating one or more indications of interference associated with the ROs, the first set of resources of the ROs overlapping with a third set of resources for downlink communications and perform a RACH procedure during a RO of the ROs that are fully duplexed with the third set of resources for the downlink communications.

Another apparatus for wireless communication is described. The apparatus may include means for transmitting, control signaling indicating a first set of resources for ROs and a second set of resources for communicating one or more indications of interference associated with the ROs, the first set of resources of the ROs overlapping with a third set of resources for downlink communications and means for performing a RACH procedure during a RO of the ROs that are fully duplexed with the third set of resources for the downlink communications.

A non-transitory computer-readable medium storing code for wireless communication at a base station is described. The code may include instructions executable by a processor to transmit, control signaling indicating a first set of resources for ROs and a second set of resources for communicating one or more indications of interference associated with the ROs, the first set of resources of the ROs overlapping with a third set of resources for downlink communications and perform a RACH procedure during a RO of the ROs that are fully duplexed with the third set of resources for the downlink communications.

Some examples of the method, apparatuses, and non-transitory computer-readable medium described herein may further include operations, features, means, or instructions for receiving a report indicating a signal strength associated with a reference signal communicated over each resource of the second set of resources for CLI measurement and where performing the RACH procedure may be further based on the report.

Some examples of the method, apparatuses, and non-transitory computer-readable medium described herein may further include operations, features, means, or instructions for determining whether to use the RO of the ROs for the RACH procedure based on the report and where performing the RACH procedure may be further based on determining whether to use the RO.

In some examples of the method, apparatuses, and non-transitory computer-readable medium described herein, the report indicates an availability of one or more ROs for the RACH procedure based on the signal strength associated with the received reference signal on each of the second set of resources for the CLI measurement.

Some examples of the method, apparatuses, and non-transitory computer-readable medium described herein may further include operations, features, means, or instructions for transmitting second control signaling indicating a change to a different resource of each of the first set of resources for the ROs in a time domain or a frequency domain, or both, based on the report and where performing the RACH procedure may be further based on the transmitted second control signaling.

Some examples of the method, apparatuses, and non-transitory computer-readable medium described herein may further include operations, features, means, or instructions for allocating, based on the report, a fourth set of resources for half duplex communications or a different set of ROs that may be non-overlapping with the third set of resources for the downlink communications.

In some examples of the method, apparatuses, and non-transitory computer-readable medium described herein, the control signaling includes a bitmap identifying one or more ROs to use for the RACH procedure.

In some examples of the method, apparatuses, and non-transitory computer-readable medium described herein, the control signaling includes an RRC message, a MAC-CE, or a DCI.

In some examples of the method, apparatuses, and non-transitory computer-readable medium described herein, the first set of resources for the ROs may be full duplexed with the third set of resources for the downlink communications.

DETAILED DESCRIPTION

Figure 1:
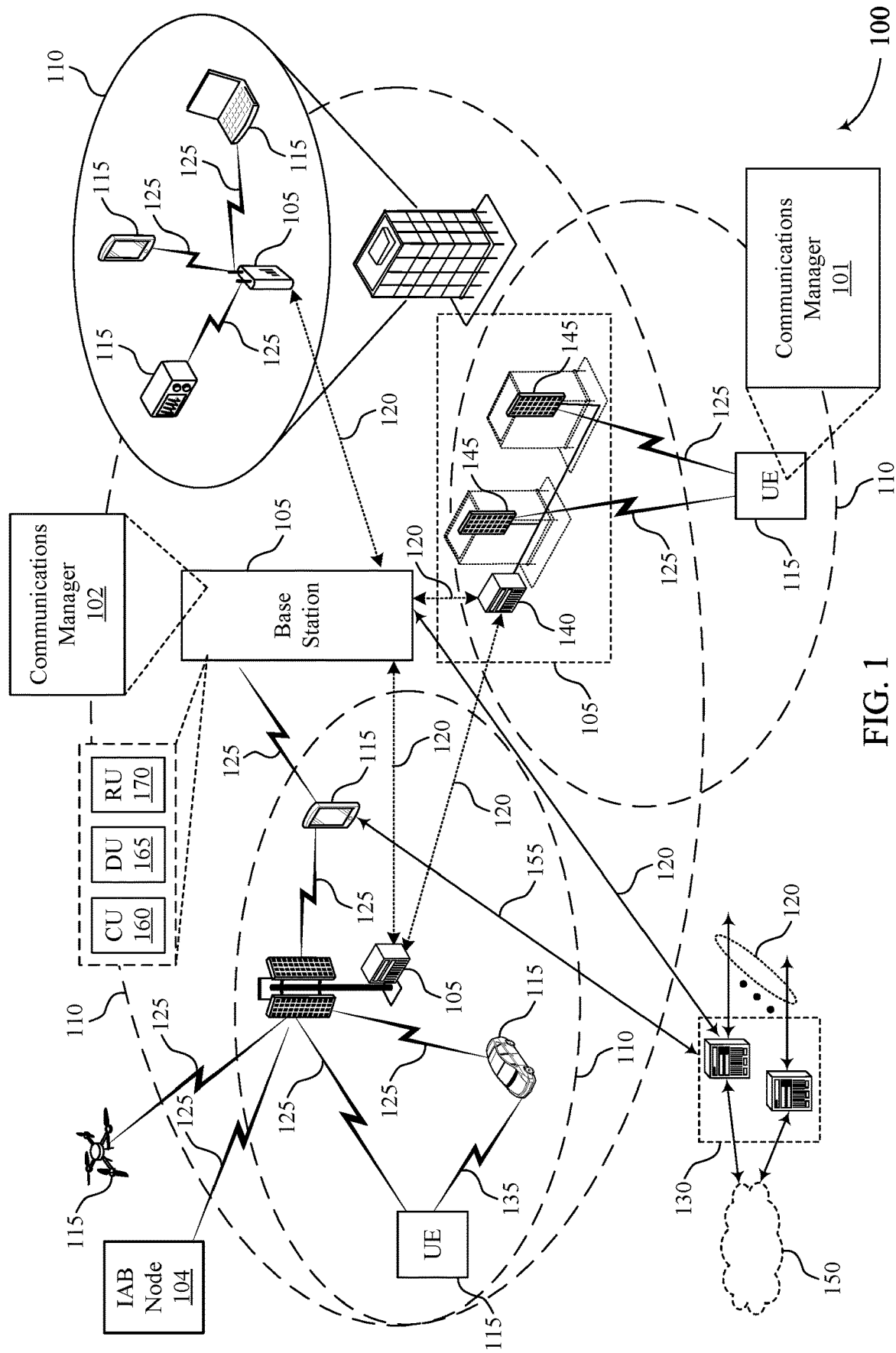
FIG. 1 illustrates an example of a wireless communications system that supports ROs and resources for interference mitigation in accordance with one or more aspects of the present disclosure.

A wireless communications system may include communication devices, such as a UE or a base station (e.g., an eNodeB (eNB), a next-generation NodeB or a giga-NodeB, any of which may be referred to as a gNB, or some other base station), that may support multiple radio access technologies. Examples of radio access technologies include 4G systems, such as LTE systems, and 5G systems, which may be referred to as NR systems. The communication devices may support wireless communication while operating in a half duplex mode or a full duplex mode. When operating in the half duplex mode, the communication devices may separately (e.g., at different times) transmit wireless communication (e.g., uplink (UL) signals, downlink (DL) signals) or receive wireless communication (e.g., UL signals, DL signals). Alternatively, when operating in the full duplex mode, the communication devices may simultaneously (e.g., at the same time) transmit wireless communication (e.g., UL signals, DL signals) and receive wireless communication (e.g., UL signals, DL signals) over the same frequency bands or overlapping frequency bands.

In some cases, when operating in a full duplex mode, a communication device (e.g., a UE) may be susceptible to interference (also referred to as CLI) from another communication device (e.g., another UE). This interference may be due to the other communication device communicating (e.g., transmitting or receiving wireless communications) at the same time and using overlapping frequency resources that the communication device is transmitting or receiving wireless communication. A RACH procedure may include an exchange of messages between two communication devices (e.g., a base station and a UE) to establish or re-establish a connection, or configure at least one of the communication devices with a configuration (e.g., parameters). In some cases, RACH occasions for a RACH procedure may be full duplexed (e.g., partially or fully overlap in a time domain) with downlink communications or uplink communications such that when the communication device (e.g., a UE) is attempting to perform a RACH procedure during a RO with the network (e.g., a base station), the interference from the other communication device may impact the RACH procedure. To mitigate interference (e.g., CLI), various aspects of the present disclosure relate to enabling a communication device to perform interference measurement and reporting to mitigate interference for the communication device when performing a RACH procedure. For example, the communication device may perform interference measurement and reporting for one or more ROs associated with the RACH procedure. The interference measurement and reporting may occur over one or more CLI resources that are configured for the interference measurement and reporting. A CLI resource may be a resource in one or both of a time domain or a frequency domain, over which the communication device may perform measurements to determine interference at the communication device.

The communication device, such as a UE in a connected mode may receive semi-static control signaling, such as an RRC message, or dynamic control signaling, such as a DCI, or a MAC-CE, that may indicate a RACH configuration. The RACH configuration may include a set of occasions (also referred to as ROs). An occasion (or RO) may be a resource in one or both of a time domain or a frequency domain, over which the communication device may perform a RACH procedure. The communication device may receive reference signals (e.g., an SRS, or the like) on one or more CLI resources. The communication device may then select one or multiple ROs to perform the RACH procedure during the selected one or multiple ROs based on measured signal strengths (e.g., RSSI) of the received reference signals on the one or more CLI resources.

The measured signal strengths may indicate whether there is interference at the communication device, for example, based on the measured signal strengths satisfying a threshold. In some aspects, the communication device may report the measured signal strengths of the received reference signals (also referred to as CLI results) to the network, which may use the reported signal strengths to indicate via control signaling (e.g., RRC, DCI, MAC-CE), which ROs can be used by the communication device for the random access procedure. In some other aspects, the network may use the reported signal strengths to adjust one or multiple ROs of the set of ROs (e.g., shift in a time domain) or schedule different communication devices during these one or multiple ROs to reduce or eliminate interference between the communication device and the other communication device.

By enabling the communication device to support reporting CLI results, the communication device may mitigate interference, such as CLI, among other examples, when performing full duplex communications when in a connected mode. The communication device may also decrease a latency and increase a reliability for the full duplex communications by mitigating interference, such as CLI. In some aspects, the communication device may experience high spectrum efficiency (e.g., per cell serving the communication device). Additionally, the communication device may manage resource utilization by mitigating interference, such as CLI.

Aspects of the disclosure are initially described in the context of wireless communications systems. Aspects of the disclosure are further illustrated by and described with reference to apparatus diagrams, system diagrams, and flowcharts that relate to ROs and resources for interference mitigation.

FIG. 1 illustrates an example of a wireless communications system 100 that supports ROs and resources for interference mitigation in accordance with one or more aspects of the present disclosure. The wireless communications system 100 may include one or more base stations 105, one or more UEs 115, and a core network 130. In some examples, the wireless communications system 100 may be an LTE network, an LTE-A network, an LTE-A Pro network, or an NR network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links. A UE 115 may communicate with the core network 130 through a communication link 155.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple DL component carriers and one or more UL component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include UL transmissions from a UE 115 to a base station 105, or DL transmissions from a base station 105 to a UE 115. Carriers may carry DL or UL communications (e.g., in an FDD mode) or may be configured to carry DL and UL communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (STTIs)).

Physical channels may be multiplexed on a carrier according to various techniques. A physical control channel and a physical data channel may be multiplexed on a DL carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrow band IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrow band communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, in the range of 300 megahertz (MHz) to 300 gigahertz (GHz). The region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below: 300 MHZ.

The wireless communications system 100 may also operate in a super high frequency (SHF) region using frequency bands from 3 GHz to 30 GHZ, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The electromagnetic spectrum is often subdivided, based on frequency/wavelength, into various classes, bands, channels, etc. In 5G NR two initial operating bands have been identified as frequency range designations FR1 (410 MHZ-7.125 GHZ) and FR2 (24.25 GHZ-52.6 GHz). It should be understood that although a portion of FR1 is greater than 6 GHZ, FR1 is often referred to (interchangeably) as a "Sub-6 GHZ" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHz-114.25 GHZ), and FR5 (114.25 GHZ-300 GHz). Each of these higher frequency bands falls within the EHF band.

With the above aspects in mind, unless specifically stated otherwise, it should be understood that the term "sub-6 GHZ" or the like if used herein may broadly represent frequencies that may be less than 6 GHZ, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHZ industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include DL transmissions, UL transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna array's (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

Techniques described herein, in addition to or as an alternative to be carried out between UEs 115 and base stations 105, may be implemented via additional or alternative wireless devices, including IAB nodes 104, distributed units (DUs) 165, centralized units (CUs) 160, radio units (RUs) 170, and the like. For example, in some implementations, aspects described herein may be implemented in the context of a disaggregated radio access network (RAN) architecture (e.g., open RAN architecture). In a disaggregated architecture, the RAN may be split into three areas of functionality corresponding to the CU 160, the DU 165, and the RU 170. The split of functionality between the CU 160, DU 165, and RU 170 is flexible and as such gives rise to numerous permutations of different functionalities depending upon which functions (e.g., MAC functions, baseband functions, radio frequency functions, and any combinations thereof) are performed at the CU 160, DU 165, and RU 170. For example, a functional split of the protocol stack may be employed between a DU 165 and an RU 170 such that the DU 165 may support one or more layers of the protocol stack and the RU 170 may support one or more different layers of the protocol stack.

Some wireless communications systems (e.g., wireless communications system 100), infrastructure and spectral resources for NR access may additionally support wireless backhaul link capabilities in supplement to wireline backhaul connections, providing an IAB network architecture. One or more base stations 105 may include CUs 160, DUs 165, and RUs 170 and may be referred to as donor base stations 105 or IAB donors. One or more DUs 165 (e.g., and/or RUs 170) associated with a donor base station 105 may be partially controlled by CUs 160 associated with the donor base station 105. The one or more donor base stations 105 (e.g., IAB donors) may be in communication with one or more additional base stations 105 (e.g., IAB nodes 104) via supported access and backhaul links. IAB nodes 104 may support mobile terminal (MT) functionality controlled and/or scheduled by DUs 165 of a coupled IAB donor. In addition, the IAB nodes 104 may include DUs 165 that support communication links with additional entities (e.g., IAB nodes 104, UEs 115, etc.) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

In some examples, the wireless communications system 100 may include a core network 130 (e.g., a next generation core network (NGC)), one or more IAB donors, IAB nodes 104, and UEs 115, where IAB nodes 104 may be partially controlled by each other and/or the IAB donor. The IAB donor and IAB nodes 104 may be examples of aspects of base stations 105. IAB donor and one or more IAB nodes 104 may be configured as (e.g., or in communication according to) some relay chain.

For instance, an access network (AN) or RAN may refer to communications between access nodes (e.g., IAB donor), IAB nodes 104, and one or more UEs 115. The IAB donor may facilitate connection between the core network 130 and the AN (e.g., via a wireline or wireless connection to the core network 130). That is, an IAB donor may refer to a RAN node with a wireline or wireless connection to core network 130. The IAB donor may include a CU 160 and at least one DU 165 (e.g., and RU 170), where the CU 160 may communicate with the core network 130 over an NG interface (e.g., some backhaul link). The CU 160 may host layer 3 (L3) (e.g., RRC, service data adaption protocol (SDAP), PDCP, etc.) functionality and signaling. The at least one DU 165 and/or RU 170 may host lower layer, such as layer 1 (L1) and layer 2 (L2) (e.g., RLC, MAC, physical (PHY), etc.) functionality and signaling, and may each be at least partially controlled by the CU 160. The DU 165 may support one or multiple different cells. IAB donor and IAB nodes 104 may communicate over an F1 interface according to some protocol that defines signaling messages (e.g., F1 AP protocol). Additionally, CU 160 may communicate with the core network over an NG interface (which may be an example of a portion of backhaul link), and may communicate with other CUs 160 (e.g., a CU 160 associated with an alternative IAB donor) over an Xn-C interface (which may be an example of a portion of a backhaul link).

IAB nodes 104 may refer to a RAN node that provides IAB functionality (e.g., access for UEs 115, wireless self-backhauling capabilities, etc.). IAB nodes 104 may include a DU 165 and an MT. A DU 165 may act as a distributed scheduling node towards child nodes associated with the IAB node 104, and the MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, an IAB node 104 may also be referred to as a parent node or a child node to other IAB nodes 104, depending on the relay chain or configuration of the AN. Therefore, the MT entity of IAB nodes 104 (e.g., MTs) may provide a Uu interface for a child node to receive signaling from a parent IAB node 104, and the DU interface (e.g., DUs 165) may provide a Uu interface for a parent node to signal to a child IAB node 104 or UE 115.

For example, IAB node 104 may be referred to a parent node associated with IAB node, and a child node associated with IAB donor. The IAB donor may include a CU 160 with a wireline (e.g., optical fiber) or wireless connection to the core network, and may act as parent node to IAB nodes 104. For example, the DU 165 of IAB donor may relay transmissions to UEs 115 through IAB nodes 104, and may directly signal transmissions to a UE 115. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling over an NR Uu interface to MT of the IAB node 104. Communications with IAB node 104 may be scheduled by DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture (e.g., one or more IAB nodes 104 or components of IAB nodes 104) may be configured to support techniques for ROs and resources for interference mitigation in full duplex wireless communications as described herein. For example, some operations described as being performed by a UE 115 or a base station 105 may additionally or alternatively be performed by components of the disaggregated RAN architecture (e.g., IAB nodes, DUs, CUs, etc.).

In some cases, one or more UEs 115 configured to operate with one or more components of a disaggregated RAN architecture may be referred to as disaggregated UEs. The disaggregated UEs may be configured to support techniques for ROs and resources for interference mitigation in full duplex wireless communications as described herein. In some cases, the disaggregated UEs may communicate with one or more donor base stations 105 or IAB donors. In addition, the IAB nodes 104 may include DUs 165 that support communication links with additional entities (e.g., IAB nodes 104, disaggregated UEs, etc.) within the relay chain or configuration of the access network (e.g., downstream). In such cases, one or more disaggregated UEs within the disaggregated RAN architecture may be configured to operate according to the techniques described herein.

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 and a UE 115 may support wireless communication while operating in a half duplex mode or a full duplex mode. In some cases, the base station 105 and the UE 115 may support wireless communication, while operating in the half duplex mode or the full duplex mode, in various radio frequency spectrum ranges, such as a frequency range 2 (FR2). When operating in the half duplex mode, the base station 105 and the UE 115 may separately (e.g., at different times) transmit wireless communication (e.g., UL signals, DL signals) or receive wireless communication (e.g., UL signals, DL signals). Alternatively, when operating in the full duplex mode, the base station 105 and the UE 115 may simultaneously (e.g., at the same time) transmit wireless communication (e.g., UL signals, DL signals) and receive wireless communication (e.g., UL signals, DL signal.

The base station 105 and the UE 115 may support communication of UL signals using one panel (e.g., an antenna panel, an antenna port) and another panel for communication of DL signals. For example, the base station 105 may receive UL signals using one panel and transmit DL signals using another panel. Similarly, the UE 115 may transmit UL signals using one panel and receive DL signals using another panel. In some cases, the wireless communication while operating in the full duplex mode may depend on a capability of the base station 105 or the UE 115. Additionally, to support full duplex operation by the base station 105 or the UE 115 may be based on a beam separation between beams for UL signals and beams for DL signals. In some other cases, to support full duplex operation by the base station 105 or the UE 115 may be based on self-interference between UL signals and DL signals at the base station 105 or the UE 115. In other cases, to support full duplex operation by the base station 105 or the UE 115 may be based on a clutter echo between UL signals and DL signals.

The base station 105 and the UE 115 may support various random access procedures. Examples of random access procedures may include a four-step RACH procedure (4-step RACH procedure) and a two-step RACH procedure (2-step RACH procedure). A random access procedure may occur over a set of occasions (also referred to as ROs). A set of occasions may include one or more occasions. In the wireless communications system 100, an occasion may be a resource in one or both of a time domain or a frequency domain, over which the base station 105 and the UE 115 may perform a random access procedure (e.g., a RACH procedure). An RO may support half duplex communications or full duplex communications. For example, one RO may support half duplex communications, while another RO may support full duplex communications.

In some cases, one or more ROs may overlap in a time domain with one or more DL occasions (DO) associated with DL communications (e.g., DL signals, synchronization signal blocks (SSBs), semi-persistent scheduled (SPS) communications) from the base station 105 to another UE 115. As described herein, an overlap may between an RO and a DO may refer to a partial overlap or a full overlap in a time domain. In some cases, the base station 105 may multiplex an RO with DL signals associated with a DO for the other UE 115 that overlaps (e.g., on same symbols, such as OFDM symbols) with the RO to reduce a latency for the random access procedure between the base station 105 and the UE 115.

In some cases, due to the overlap, the UE 115 may be susceptible to interference (also referred to as CLI) from the other UE 115. In some examples, to reduce or eliminate interference (e.g., a CLI), the UE 115 may perform CLI measurement and CLI reporting associated with one or more ROs that may correspond to one or more CLI resources associated with the other UE 115. In some aspects, the UE 115 may perform CLI measurement and CLI reporting while in an idle mode and over the one or more CLI resources. The one or more ROs may be known to the UE 115, but not the other UE 115. Alternatively, the one or more ROs may be known to both the UE 115 and the other UE 115. In some other aspects, the other UE 115 (e.g., scheduled to receive DL signals from the base station 105) may perform CLI measurement and CLI reporting when receiving the DL signals from the base station 105. In other aspects, the UE 115 and the other UE 115 may support coordination to mitigate CLI.

A UE 115 may include a communications manager 101 that enables techniques for ROs and resources for interference mitigation. Similarly, a base station 105 may include a communications manager 102 that enables techniques for ROs and resources for interference mitigation. In the wireless communications system 100, a UE 115 may receive control signaling, such as an RRC message, or a DCI, or a MAC-CE, that may indicate a RACH configuration. The RACH configuration may include a set of ROs. An RO may be a resource in one or both of a time domain or a frequency domain, over which the UE 115 may perform a random access procedure (e.g., a RACH procedure). In some cases, when in the full duplex mode, the UE 115 may be susceptible to interference (e.g., CLI) from another UE 115. To reduce or eliminate interference with the other UE 115, the UE 115 may support CLI measurement and CLI reporting associated with one or more ROs of a set of ROs for full duplex mode (also referred to as full duplex ROs) that may correspond to one or more CLI resources of a set of CLI resources associated with the other communication device. A CLI resource may be a resource in one or both of a time domain or a frequency domain, over which the UE 115 may perform CLI measurements to determine CLI at the UE 115. For example, the UE 115 may receive reference signals on each of the one or more CLI resources, and based on measured signal strengths of the received reference signals on each of the one or more CLI resources, the UE 115 may select one or multiple full duplex ROs to perform the random access procedure.

The measured signal strengths may indicate whether there is interference at the UE 115, for example, based on the measured signal strengths satisfying a threshold. In some aspects, the UE 115 may report the measured signal strengths of the received reference signals (also referred to as CLI results) to the base station 105, which may use the reported signal strengths to indicate via control signaling (e.g., RRC, DCI, MAC-CE) which full duplex ROs can be used by the UE 115 for the random access procedure. In some other aspects, the base station 105 may use the reported signal strengths to adjust one or multiple full duplex ROs (e.g., shift in a time domain) or schedule different UEs 115 during these one or multiple full duplex ROs to reduce or eliminate interference between the UE 115 and the other UEs in the wireless communications system 100. By enabling the UE 115 to support measuring and reporting CLI results, the UE 115 may mitigate CLI issues, among other examples, when performing full duplex communications when in a connected mode.

Figure 2A:
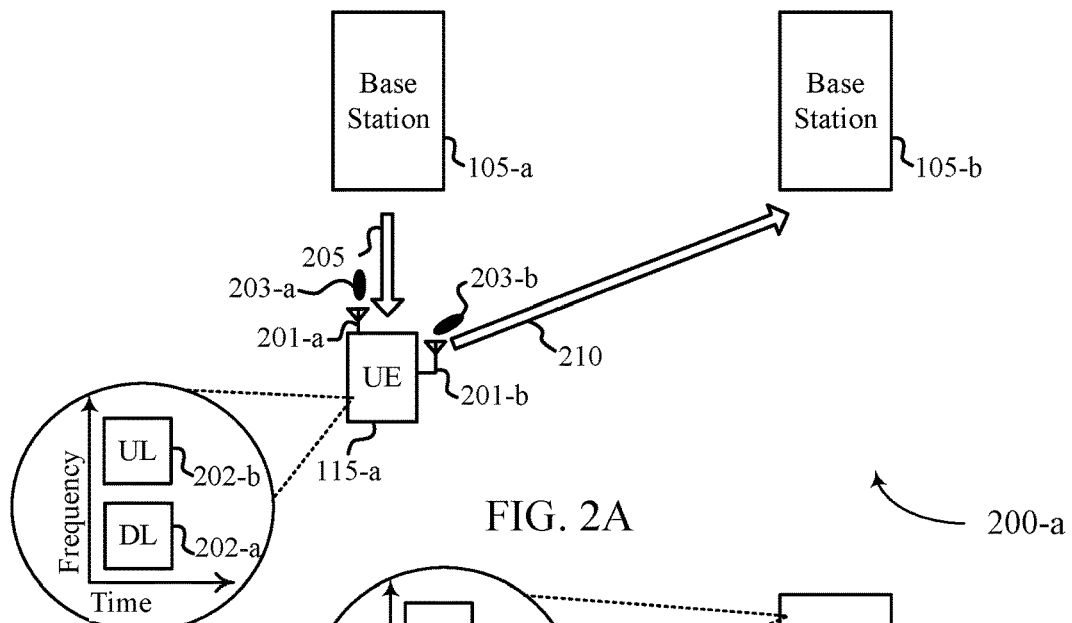
FIGS. 2A through 2C illustrate examples of wireless communications systems that support ROs and resources for interference mitigation in accordance with one or more aspects of the present disclosure.

FIG. 2A illustrates an example of a wireless communications system 200-a that supports ROs and resources for interference mitigation in accordance with one or more aspects of the present disclosure. The wireless communications system 200-a may implement aspects of the wireless communications system 100 or may be implemented by aspects of the wireless communications systems 100 as described with reference to FIG. 1. For example, the wireless communications system 200-a may include a base station 105-a, a base station 105-b, and a UE 115-a, which may be examples of corresponding devices as described with reference to FIG. 1. In the example of FIG. 2A, the UE 115-a may support wireless communication with the base station 105-a (e.g., a first TRP) and the base station 105-b (e.g., a second TRP) when operating in a full duplex mode.

The UE 115-a may concurrently (e.g., partially or fully during the same time) receive DL communication 205 from the base station 105-a using one antenna panel 201-a, and transmit UL communication 210 to the base station 105-b using another antenna panel 201-b. For example, the DL communication 205 may be associated with a DL resource 202-a, which may partially or fully overlap in a time domain with an UL resource 202-b associated with the UL communication 210. The UE 115-a may support wireless communication with the base station 105-a and the base station 105-b using a beam or a beam pair (e.g., a DL beam and an UL beam). For example, the UE 115-a may concurrently receive the DL communication 205 from the base station 105-a using a DL beam 203-a, and transmit the UL communication 210 to the base station 105-b using an UL beam 203-b.

By enabling the UE 115-a to support wireless communication using one or more of a beam or a beam pair when operating in the full duplex mode, the UE 115-a may mitigate self-interference, among other examples. Additionally, enabling the UE 115-a to support wireless communication using one or more of a beam or a beam pair when operating in the full duplex mode may reduce latency (e.g., enabling the UE 115-c to receive DL communication during one or more UL slots), increased spectrum efficiency (e.g., increased efficiency per cell, increased efficiency for the UE 115-a), efficient resource utilization, among other examples.

Figure 2B:
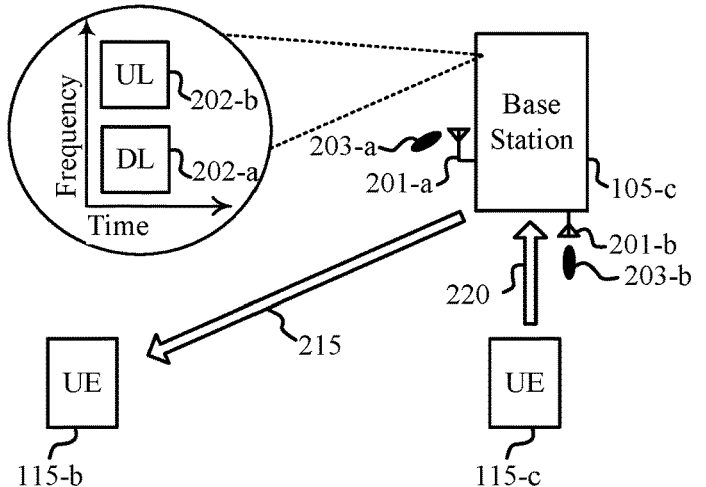

FIG. 2B illustrates an example of a wireless communications system 200-b that supports ROs and resources for interference mitigation in accordance with one or more aspects of the present disclosure. The wireless communications system 200-b may implement aspects of the wireless communications system 100 or may be implemented by aspects of the wireless communications system 100 as described with reference to FIG. 1. For example, the wireless communications system 200-b may include a base station 105-c, a UE 115-b, and a UE 115-c, which may be examples of corresponding devices as described with reference to FIG. 1. In the example of FIG. 2B, the base station 105-c may support wireless communication with the UE 115-b and the UE 115-c while operating in a full duplex mode.

For example, the base station 105-c may simultaneously (e.g., at the same time) transmit DL communication 215 to the UE 115-b using one antenna panel 201-a, and receive UL communication 220 from the UE 115-c using another antenna panel 201-b. For example, the DL communication 215 may be associated with a DL resource 202-a, which may partially or fully overlap in a time domain with an UL resource 202-b associated with the UL communication 220. In some examples, the base station 105-c may support wireless communication with the UE 115-b and the UE 115-c using a beam or a beam pair. For example, the base station 105-c may concurrently transmit the DL communication 215 to the UE 115-b using a DL beam 203-a, and receive the UL communication 220 from the UE 115-c using an UL beam 203-b. Likewise, the UE 115-b may receive the DL communication 215 using a DL beam, and the UE 115-c may receive the UL communication 220 using an UL beam.

By enabling one or more of the UE 115-b or the UE 115-c to support wireless communication using one or more of a beam or a beam pair when operating in the full duplex mode, one or more of the UE 115-b or the UE 115-c may alleviate self-interference problems. In addition, by enabling one or more of the UE 115-b or the UE 115-c to support wireless communication using one or more of a beam or a beam pair when operating in the full duplex mode may reduce latency (e.g., enabling one or more of the UE 115-b or the UE 115-c to receive DL communication during one or more UL slots), increased spectrum efficiency (e.g., increased efficiency per cell, increased efficiency for one or more of the UE 115-b or the UE 115-c), among other examples.

Figure 2C:
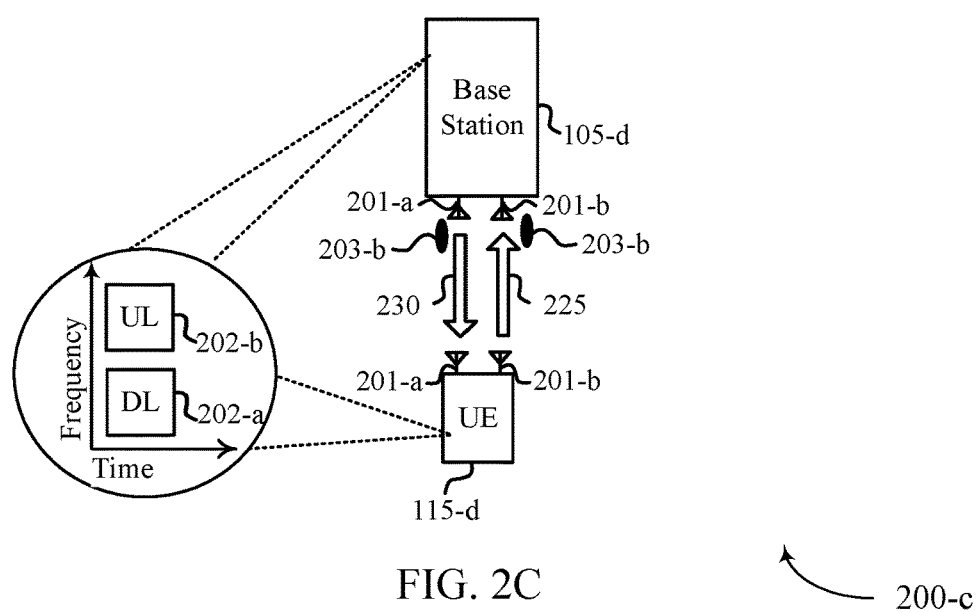

FIG. 2C illustrates an example of a wireless communications system 200-c that supports ROs and resources for interference mitigation in accordance with one or more aspects of the present disclosure. The wireless communications system 200-c may implement aspects of the wireless communications system 100 or may be implemented by aspects of the wireless communications system 100 as described with reference to FIG. 1. For example, the wireless communications system 200-c may include a base station 105-d and a UE 115-d, which may be examples of corresponding devices as described with reference to FIGS. 1 and 2. In the example of FIG. 2C, the base station 105-d and the UE 115-d may support wireless communication with each other while operating in a full duplex mode.

The base station 105-d may at the same time transmit DL communication 230 to the UE 115-d using one antenna panel 201-a, and receive UL communication 225 from the UE 115-d using another antenna panel 201-b. Likewise, the UE 115-d may at the same time receive the DL communication 230 from the base station 105-d using one antenna panel 201-a, and transmit the UL communication 225 to the base station 105-d using another antenna panel 201-b. For example, the DL communication 230 may be associated with a DL resource 202-a, which may partially or fully overlap in a time domain with an UL resource 202-b associated with the UL communication 225. In some examples, one or more of the base station 105-d and the UE 115-d may support wireless communication using a beam or a beam pair. For example, the base station 105-d may at the same time transmit DL communication 230 to the UE 115-d using a DL beam 203-a, and receive UL communication 225 from the UE 115-d using a using an UL beam 203-b. Likewise, the UE 115-d may at the same time receive the DL communication 230 from the base station 105-*d* using a DL beam, and transmit the UL communication 225 to the base station 105-*d* using an UL beam.

By enabling one or more of the base station 105-*d* or the UE 115-*d* to support wireless communication using one or more of a beam or a beam pair when operating in the full duplex mode, one or more of the base station 105-*d* or the UE 115-*d* may alleviate self-interference problems. The wireless communications system 200-*c* may also reduce latency (e.g., enabling the UE 115-*d* to receive DL communication during one or more UL slots), increased spectrum efficiency (e.g., increased efficiency per cell, increased efficiency for the UE 115-*d*), among other examples by enabling one or more of the base station 105-*d* or the UE 115-*d* to support wireless communication using one or more of a beam or a beam pair when operating in the full duplex mode.

Figure 3:
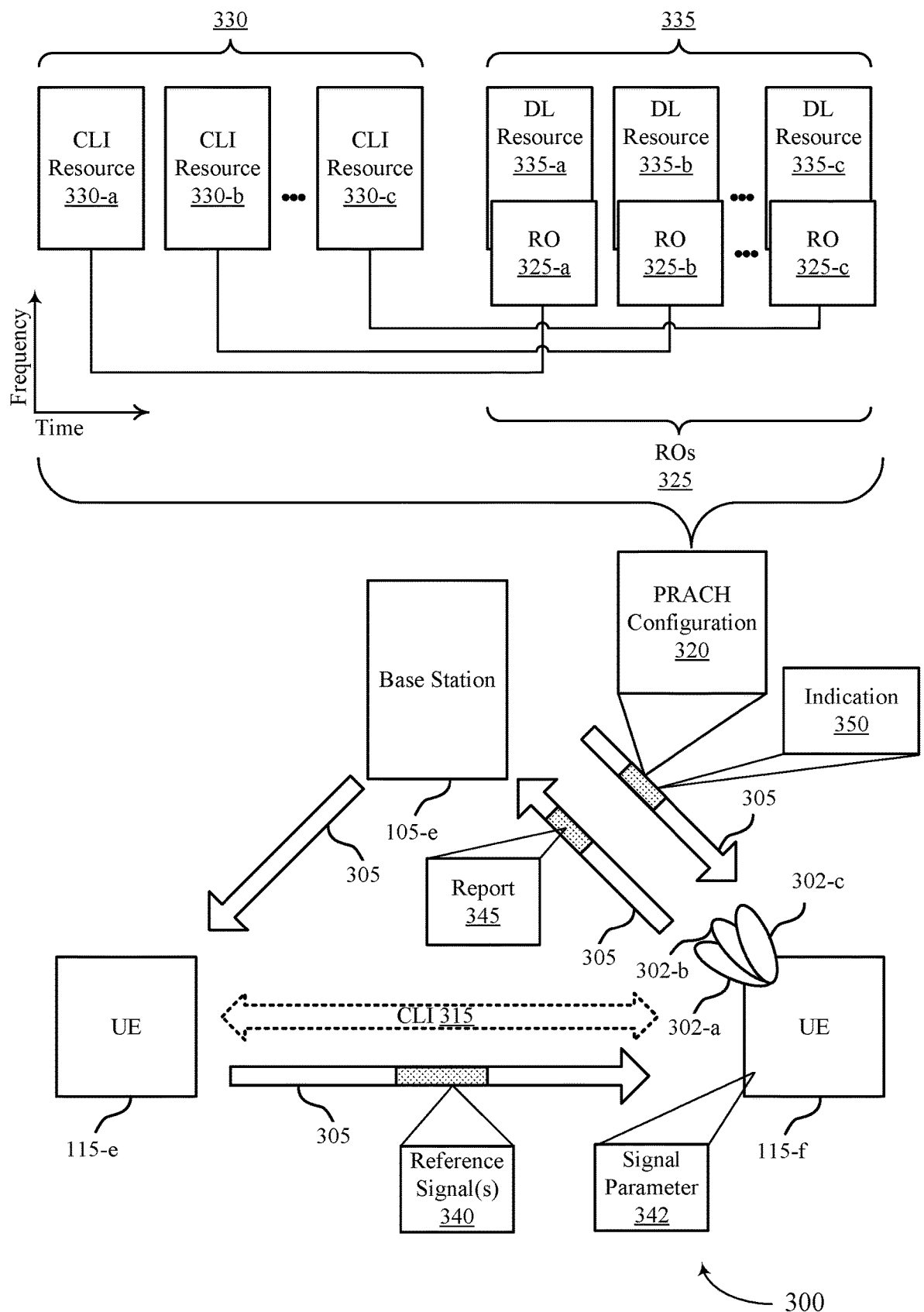
FIG. 3 illustrates an example of a wireless communications system that supports ROs and resources for interference mitigation in accordance with one or more aspects of the present disclosure.

FIG. 3 illustrates an example of a wireless communications system 300 that supports ROs and resources for interference mitigation in accordance with one or more aspects of the present disclosure. The wireless communications system 300 may implement aspects of the wireless communications system 100 or may be implemented by aspects of the wireless communications system 100 as described with reference to FIG. 1. Additionally, the wireless communications system 300 may implement aspects of the wireless communications system 200-*b* or may be implemented by aspects of the wireless communications system 200-*b* as described with reference to FIG. 2B. For example, the wireless communications system 300 may include a base station 105-*e*, a UE 115-*e*, and a UE 115-*f*, which may be examples of corresponding devices as described with reference to FIGS. 1 and 2A through 2C. The base station 105-*e*, the UE 115-*e*, and the UE 115-*f* may communicate over communication links 305, which may be examples of communication links 125 as described with reference to FIG. 1. One or both of the UE 115-*e* or the UE 115-*f* may be in a connected mode or an idle mode.

In the example of FIG. 3, the base station 105-*e*, the UE 115-*e*, and the UE 115-*f* may be configured with multiple antennas, which may be used to employ techniques such as beamforming. The antennas of the base station 105-*e*, the UE 115-*e*, and the UE 115-*f* may be located within one or more antenna arrays or antenna panels, which may support multiple-input multiple-output operations or transmit or receive beamforming. The base station 105-*e* may have an antenna array with a number of rows and columns of antenna ports that the base station 105-*e* may use to support beamforming of communications with one or both of the UE 115-*e* or the UE 115-*f*. Likewise, one or both of the UE 115-*e* or the UE 115-*f* may have one or more antenna arrays that may support various beamforming operations.

The base station 105-*e*, the UE 115-*e*, and the UE 115-*f* may support wireless communication while operating in a full duplex mode. In some cases, when in the full duplex mode, the UE 115-*f* may be susceptible to interference from the UE 115-*e*. For example, the UE 115-*f* may be susceptible to CLI 315 from the UE 115-*e*. In some cases, when the UE 115-*a* is attempting to perform a RACH procedure during a RO with the base station 105-*e*, the interference from the UE 115-*e* may impact the RACH procedure. To mitigate interference (e.g., the CLI 310), the UE 115-*f* may support CLI measurement and CLI reporting. The base station 105-*e* may transmit, and the UE 115-*f* may receive, control signaling carrying a physical RACH (PRACH) configuration 320, which may include a set of ROs 325. For example, the base station 105-*e* may transmit, and the UE 115-*f* may receive, the PRACH configuration 320 in an RRC configuration message or a MAC-CE. Each of one or more of the ROs 325 may correspond to each of one or more CLI resources of a set of CLI resources 330, which may be associated with the UE 115-*e*. In other words, each RO 325 may be configured with a linked CLI resource 330. For example, a first RO 325-*a* may be associated with a first CLI resource 330-*a*, a second RO 325-*b* may be associated with a second CLI resource 330-*b*, and a third RO 325-*c* may be associated with a third CLI resource 330-*a*.

Additionally, each RO 325 may correspond to a CLI resource 330 for CLI measurement on a beam 302 associated with each RO 325. For example, a first beam 302-*a* may be associated with the first RO 325-*a*, a second beam 302-*b* may be associated with the second RO 325-*b*, and a third beam 302-*c* may be associated with the third RO 325-*c*. The UE 115-*f* may perform CLI measurements on each of the first beam 302-*a* associated with the first RO 325-*a*, the second beam 302-*b* associated with the second RO 325-*b*, and the third beam 302-*c* associated with the third RO 325-*c*. Additionally, the base station 105-*e* may schedule wireless communications (e.g., DL signals) for the UE 115-*e* during a set of DL resources 335. In the example of FIG. 3, the set of ROs 325 may overlap with the set of DL resources 335 in a time domain. For example, the first RO 325-*a* may overlap with a first DL resource 335-*a*, the second RO 325-*a* may overlap with a second DL resource 335-*b*, and a third RO 325-*a* may overlap with a third DL resource 335-*c*. In the example of FIG. 3, the CLI resources 330 and the DL resources 335 are associated with the UE 115-*e*. In some examples, one or more of the ROs 325, the CLI resources 330 or the DL resources 335 may be based on a TDD configuration.

The UE 115-*e* may transmit, and the UE 115-*f* may receive, reference signal(s) 340 on one or more CLI resources of the set of CLI resources 330 for communicating one or more indications of CLI 315. For example, the UE 115-*e* may transmit, and the UE 115-*f* may receive, an SRS or other reference signal 340 over one or more of the first CLI resource 330-*a*, the second CLI resource 330-*b*, or the third CLI resource 330-*c*. The UE 115-*f* may determine a signal parameter 342, such as signal strengths of the reference signals 340 received on the one or more CLI resources of the set of CLI resources 330 to determine the CLI 315 at the UE 115-*f*. For example, the UE 115-*f* may determine an RSSI based on the reference signals 340 received over the one or more CLI resources of the set of CLI resources 330. The UE 115-*f* may then use the signal strengths of the reference signals 340 received over the one or more CLI resources of the set of CLI resources 330 to determine which ROs of the set of ROs 325 to use for a random access procedure with the base station 105-*e*. In some examples, the UE 115-*f* may select a RO of the set of ROs 325 for a random access procedure if a measured RSSI of the RO satisfies a threshold (e.g., below a threshold).

For example, the UE 115-*f* may determine that a signal strength of a received reference signal 340 associated with the first CLI resource 330-*a* satisfies a threshold (e.g., below a threshold). The UE 115-*f* may select the first RO 325-*a* associated with the first CLI resource 330-*a* for the random access procedure with the base station 105-*a* because the CLI 315 may be low (e.g., equal to or below a threshold), and thereby the UE 115-*f* might not be susceptible to the CLI 315. Additionally or alternatively, the UE 115-*f* may determine that a signal strength of a received reference signal 340 associated with one or both of the second CLI resource 330-*b* or the third CLI resource 330-*c* satisfies a threshold (e.g., below a threshold. Similarly, the UE 115-*f* may select one or both of the second RO 325-*b* associated with the second CLI resource 330-*b* or the third RO 325-*c* associated with the third CLI resource 330-*c* for the random access procedure with the base station 105-*a* because the CLI 315 may be low (e.g., equal to or below a threshold), and thereby the UE 115-*f* might not be susceptible to the CLI 315.

The UE 115-*f* may transmit, and the base station 105-*e* may receive, a report 345, which may indicate the signal strengths associated with the received reference signal(s) 340 on each of one or more CLI resources of the set of CLI resources 330. In other words, the UE 115-*f* may transmit, and the base station 105-*e* may receive, a report 345, which may indicate CLI results. The base station 105-*e* may use the reported signal strengths (e.g., CLI results) associated with the received reference signal(s) 340 on each of one or more CLI resources of the set of CLI resources 330 to indicate to the UE 115-*f* which ROs 325 to use for the random access procedure. For example, the base station 105-*e* may transmit, and the UE 115-*f* may receive, an indication 350 that may indicate which ROs of the set of ROs 325 to use for the random access procedure. In some examples, the indication 350 may be a mask (e.g., bitmask) in an RRC message or MAC-CE as described in more detail in FIG. 4. The UE 115-*f* may then determine which ROs of the set of ROs 325 to select, for example, if the signal strengths (e.g., CLI results) associated with the received reference signal(s) 340 on each of one or more CLI resources of the set of CLI resources 330 satisfies a threshold (e.g., falls below a threshold).

In some examples, the base station 105-*e* may use the reported signal strengths (e.g., CLI results) associated with the received reference signal(s) 340 on each of one or more CLI resources of the set of CLI resources 330 to reconfigure a location of one or more ROs of the set of ROs 325 that are observing high CLI 315 (e.g., equal to above a threshold). For example, the base station 105-*e* may shift one or more of the first RO 325-*a*, the second RO 325-*b*, or the third RO 325-*c* later in time based on the UE 115-*f* tracking a high CLI 315 on one or more of the first RO 325-*a*, the second RO 325-*b*, or the third RO 325-*c* during an interval (e.g., a period). In some other examples, the base station 105-*e* may use the reported signal strengths (e.g., CLI results) associated with the received reference signal(s) 340 on each of one or more CLI resources of the set of CLI resources 330 to schedule a different UE during one or more of the first RO 325-*a*, the second RO 325-*b*, or the third RO 325-*c*. The different UE may be associated with a lower CLI 315 compared to the UE 115-*e*.

In some examples, the UE 115-*f* may transmit, and the base station 105-*e* may receive, the report 345, which may directly report which ROs of the set of ROs 325 are not available due to the CLI 315 satisfying a threshold (e.g., equal to or above a threshold). Additionally or alternatively, the UE 115-*f* may be configured with a contention-free random access beam failure recovery resource, which may be event triggered to report that all ROs of the set of ROs 325 are observing high CLI 315, based on which the base station 105-*e* may configure half duplex ROs or new ROs not FDM'd with the same UE 115-*e* (e.g., DL UE). For example, the UE 115-*f* may transmit, and the base station 105-*e* may receive, the report 345, which may indicate that all ROs of the set of ROs 325 are observing high (e.g., above a threshold) CLI 315.

By enabling the UE 115-*f* to support reporting CLI results, the UE 115-*f* may mitigate CLI issues, among other examples, when performing full duplex communications when in a connected mode in the wireless communications system 300.

Figure 4:
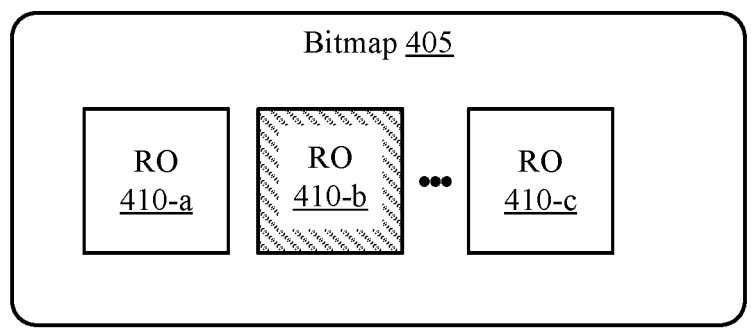
FIG. 4 illustrates an example of a control message that supports ROs and resources for interference mitigation in accordance with one or more aspects of the present disclosure.

FIG. 4 illustrates an example of a control message 400 that supports ROs and resources for interference mitigation in accordance with one or more aspects of the present disclosure. The control message 400 may implement aspects of the wireless communications system 300 or may be implemented by aspects of the wireless communications system 300 as described with reference to FIG. 3. The control message 400 may be an RRC message, a MAC-CE, or a DCI. A base station 105 may transmit, and a UE 115 may receive, the control message 400, which may include a bitmap 405 indicating which ROs 410 can be used for a random access procedure, among other examples. In some examples, the bitmap 405 may be mask used to indicate which ROs 410 can be used for a RACH procedure.

In the example of FIG. 4, the bitmap 405 may indicate that a first RO 410-*a* and a third RO 410-*c* may be used by the UE 115, while a second RO 410-*b* may not or cannot be used by the UE 115 for the random access procedure (e.g., a RACH procedure) due to CLI. For example, the bitmap 405 may indicate that the second RO 410-*b* may not or cannot be used by the UE 115 because the second RO 410-*b* is associated with a high CLI (e.g., equal to or above a threshold) as described in FIG. 3. By enabling the control message 400 to indicate which ROs may be used by the UE 115, the UE 115 may mitigate CLI issues, among other examples, when performing a RACH procedure.

Figure 5:
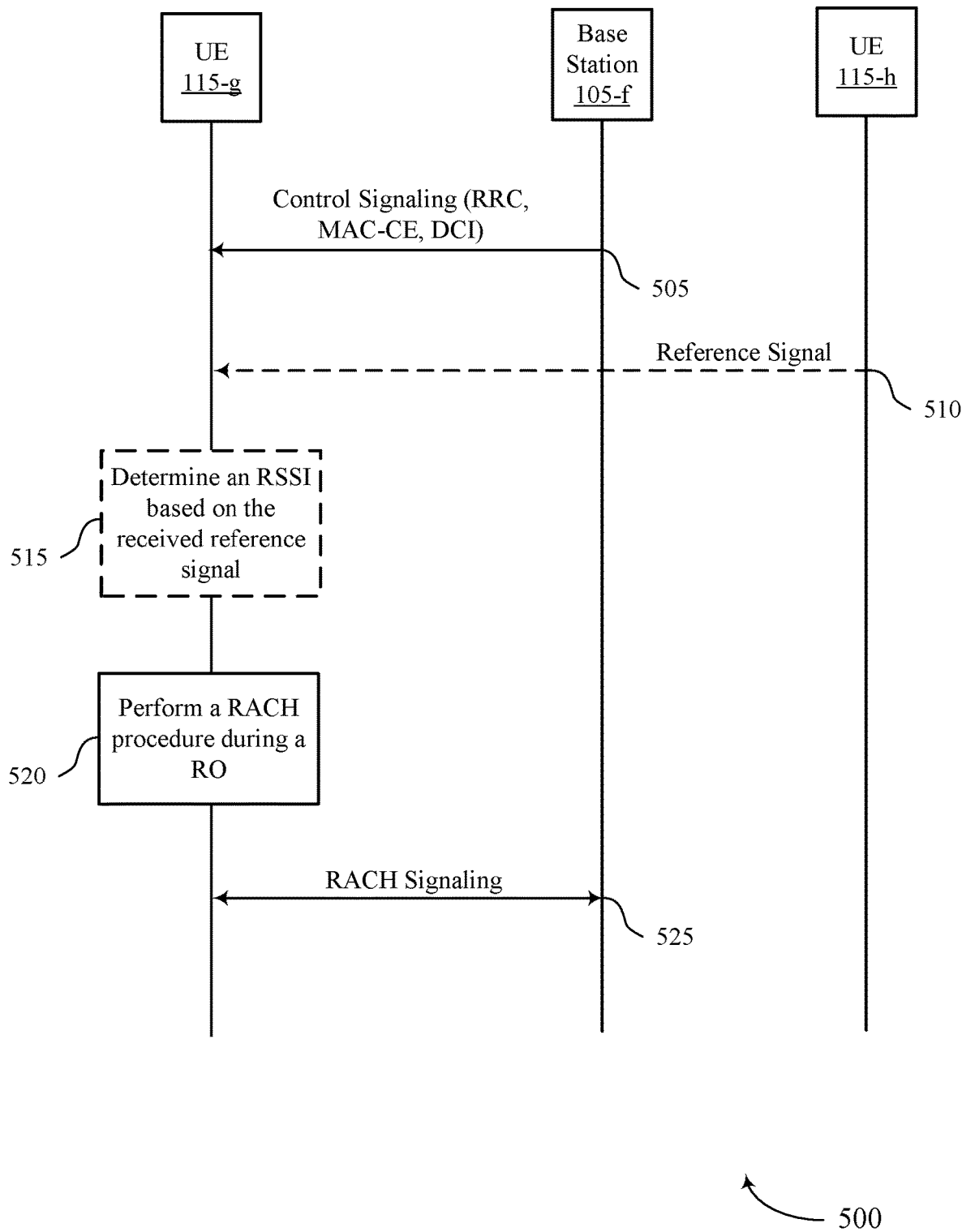
FIG. 5 illustrates an example of a process flow that supports ROs and resources for interference mitigation in accordance with one or more aspects of the present disclosure.

FIG. 5 illustrates an example of a process flow 500 that supports ROs and resources for interference mitigation in accordance with one or more aspects of the present disclosure. In some examples, the process flow 500 may implement or be implemented by aspects of the wireless communications system 100, 200-*a* through 200-*c*, and 300. For example, the process flow 500 may include a base station 105-*f*, a UE 115-*g*, and a UE 115-*h*, which may be examples of the corresponding devices described herein. In the following description of the process flow 500, the operations between the base station 105-*f*, the UE 115-*g*, and the UE 115-*h* may be transmitted in a different order than the example order shown, or the operations performed by the base station 105-*f*, the UE 115-*g*, and the UE 115-*h* may be performed in different orders or at different times, or the operations performed by a device may additionally or alternatively be performed by another device. Some operations may also be omitted from the process flow 500, and other operations may be added to the process flow 500.

At 505, the base station 105-*g* may transmit, and the UE 115-*g* may receive, control signaling (e.g., an RRC message, a MAC-CE, or a DCI). The control signaling may indicate a first set of resources for ROs and a second set of resources for communicating one or more indications of interference (e.g., CLI) associated with the ROs. Each RO may correspond to a resource of the second set of resources for CLI measurement on a beam associated with each RO. In some examples, the UE 115-*g* may receive the control signaling based on the UE 115-*g* being in a connected mode. In some examples, the control signaling may include a bitmap (e.g., mask) identifying one or more of the ROs to use for the RACH procedure.

At 510, the UE 115-*h* may transmit, and the UE 115-*g* may receive, a reference signal. For example, the UE 115-*h* may transmit, and the UE 115-*g* may receive, a reference signal over at least one resource of the second set of resources. The reference signal may be an SRS, or other reference signal (e.g., a sidelink reference signal). In some examples, the UE 115-g may receive an SRS over the at least one resource of the second set of resources for CLI measurement.

At 515, the UE 115-g may determine an RSSI based on the received reference signal. The UE 115-g may determine whether to use the RO associated with the at least one resource of the second set of resources for the CLI measurement based on the RSSI satisfying the threshold. At 520, the UE 115-g may perform a RACH procedure during a RO. For example, the RO may be associated with the at least one resource and may be based on a signal parameter (e.g., an RSSI) associated with the received reference signal satisfying a threshold. At 525, the base station 105-f and the UE 115-g may exchange RACH signaling (e.g., exchange of one or more random access messages).

Figure 6:
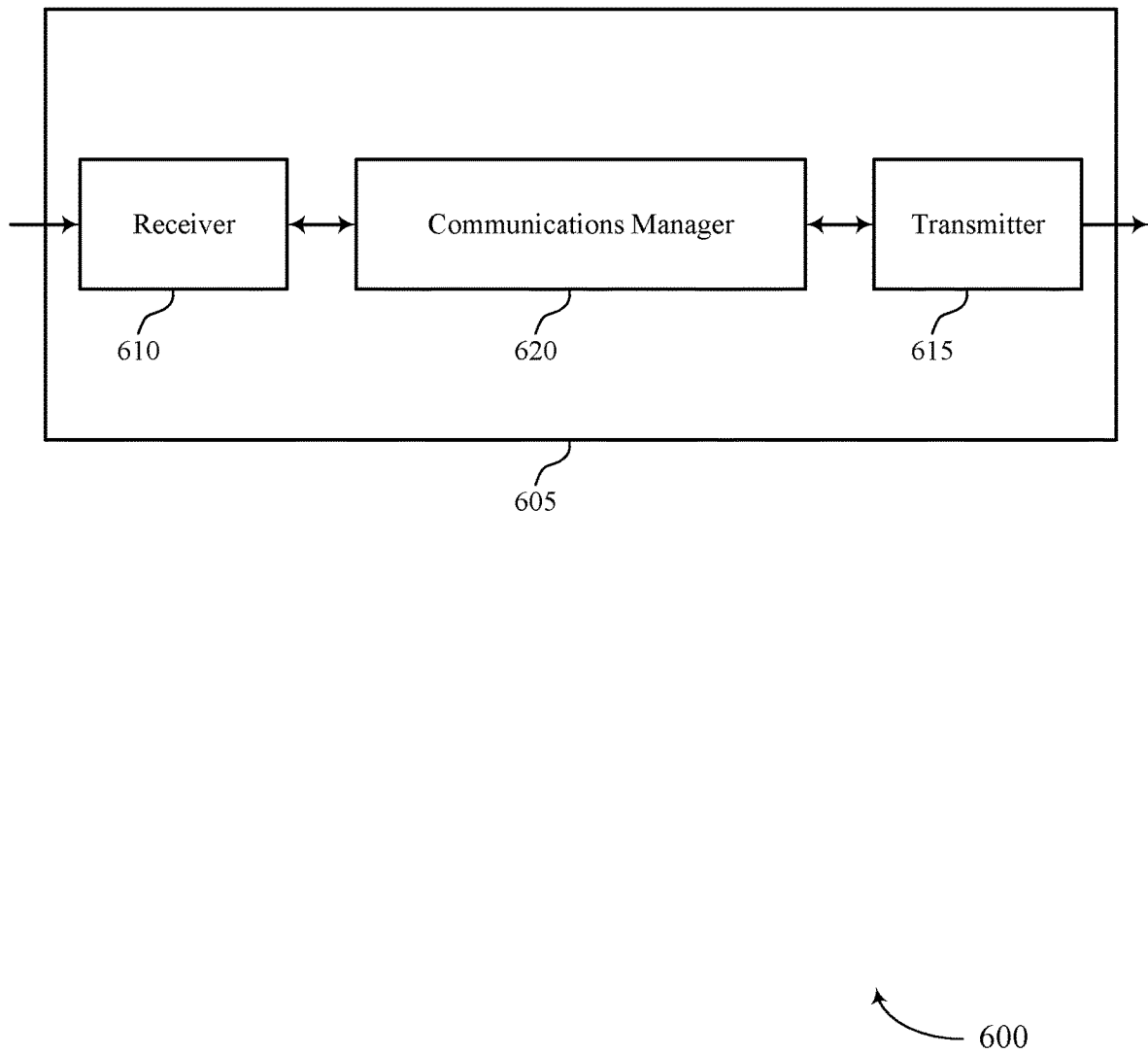
FIGS. 6 and 7 show block diagrams of devices that support ROs and resources for interference mitigation in accordance with one or more aspects of the present disclosure.

FIG. 6 shows a block diagram 600 of a device 605 that supports ROs and resources for interference mitigation in accordance with one or more aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to ROs and resources for interference mitigation). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to ROs and resources for interference mitigation). In some examples, the transmitter 615 may be co-located with a receiver 610 in a transceiver. The transmitter 615 may utilize a single antenna or a set of multiple antennas.

The communications manager 620, the receiver 610, the transmitter 615, or various combinations thereof or various components thereof may be examples of means for performing various aspects of ROs and resources for interference mitigation as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

The communications manager 620 may support wireless communication at the device 605 (e.g., a first UE) in accordance with examples as disclosed herein. For example, the communications manager 620 may be configured as or otherwise support a means for receiving control signaling indicating a first set of resources for ROs and a second set of resources for communicating one or more indications of interference associated with the ROs. The communications manager 620 may be configured as or otherwise support a means for receiving, from a second UE, a reference signal over at least one resource of the second set of resources. The communications manager 620 may be configured as or otherwise support a means for performing a RACH procedure during a RO, the RO associated with the at least one resource and is based on a signal parameter associated with the received reference signal satisfying a threshold.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for more efficient utilization of communication resources.

Figure 7:
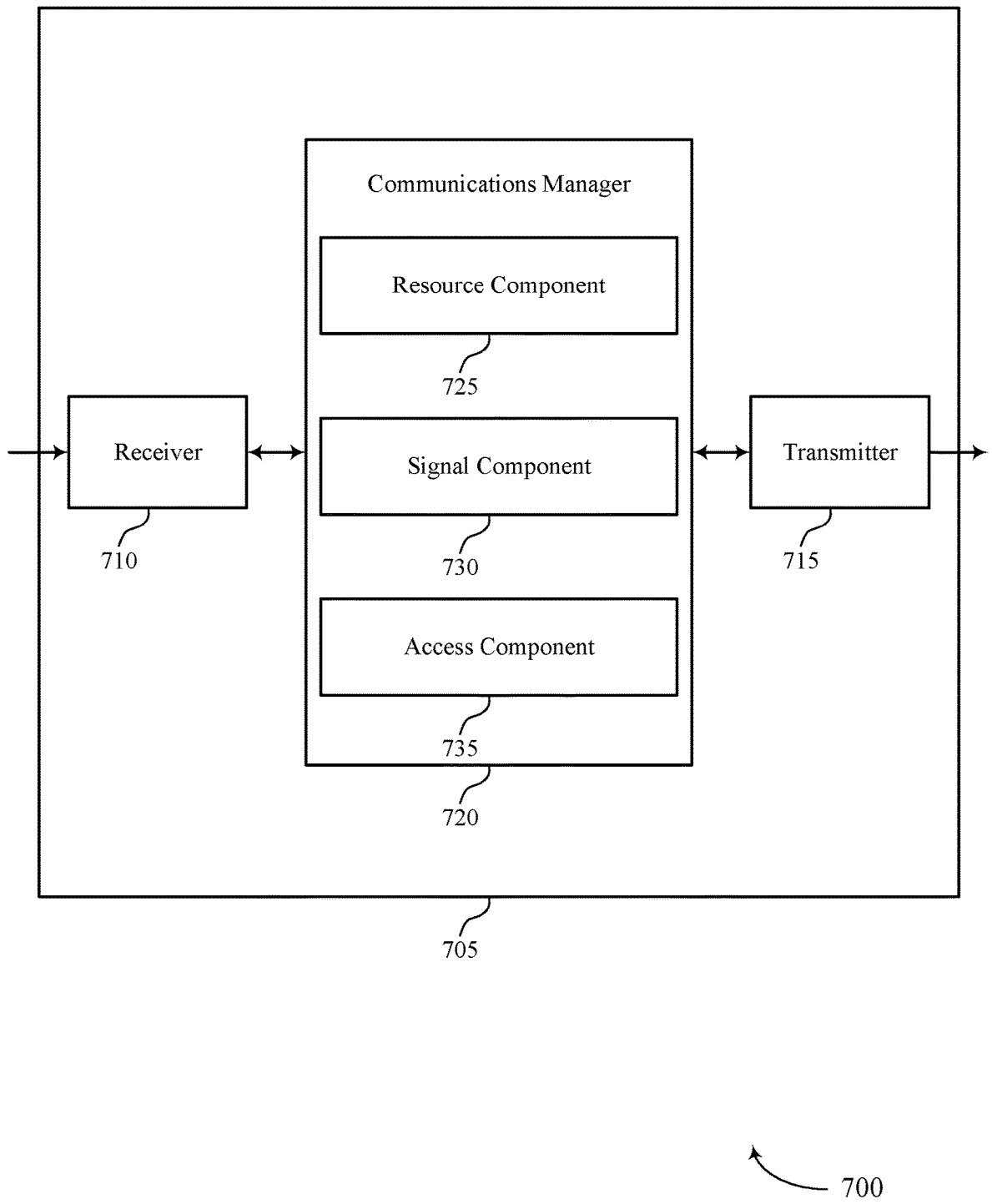

FIG. 7 shows a block diagram 700 of a device 705 that supports ROs and resources for interference mitigation in accordance with one or more aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to ROs and resources for interference mitigation). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to ROs and resources for interference mitigation). In some examples, the transmitter 715 may be co-located with a receiver 710 in a transceiver. The transmitter 715 may utilize a single antenna or a set of multiple antennas.

The device 705, or various components thereof, may be an example of means for performing various aspects of ROs and resources for interference mitigation as described herein. For example, the communications manager 720 may include a resource component 725, a signal component 730, an access component 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communication at the device 705 (e.g., a first UE) in accordance with examples as disclosed herein. The resource component 725 may be configured as or otherwise support a means for receiving control signaling indicating a first set of resources for ROs and a second set of resources for communicating one or more indications of interference associated with the ROs. The signal component 730 may be configured as or otherwise support a means for receiving, from a second UE, a reference signal over at least one resource of the second set of resources. The access component 735 may be configured as or otherwise support a means for performing a RACH procedure during a RO, the RO associated with the at least one resource and is based on a signal parameter associated with the received reference signal satisfying a threshold.

Figure 8:
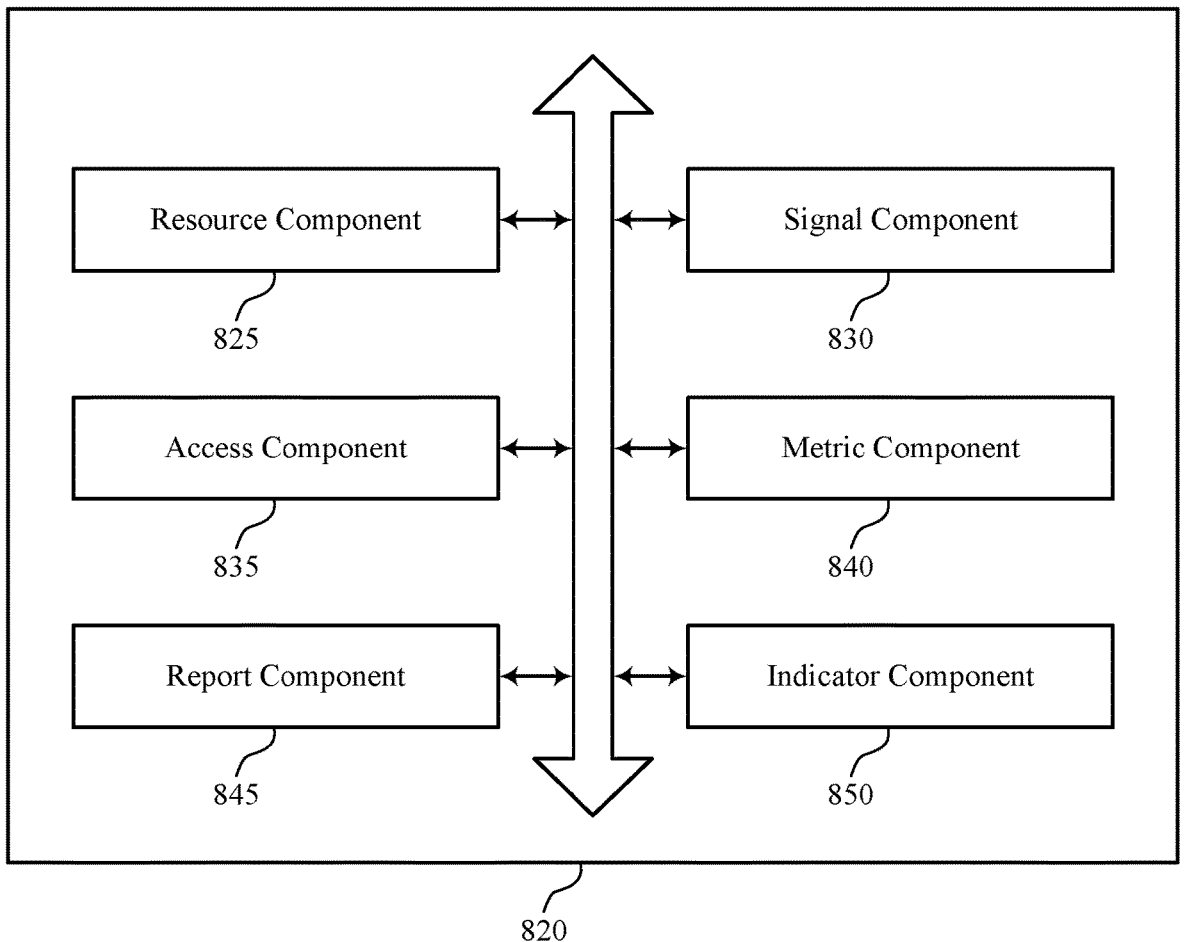
FIG. 8 shows a block diagram of a communications manager that supports ROs and resources for interference mitigation in accordance with one or more aspects of the present disclosure.

FIG. 8 shows a block diagram 800 of a communications manager 820 that supports ROs and resources for interference mitigation in accordance with one or more aspects of the present disclosure. The communications manager 820 may be an example of aspects of a communications manager 620, a communications manager 720, or both, as described herein. The communications manager 820, or various components thereof, may be an example of means for performing various aspects of ROs and resources for interference mitigation as described herein. For example, the communications manager 820 may include a resource component 825, a signal component 830, an access component 835, a metric component 840, a report component 845, an indicator component 850, or any combination thereof. Each of these components may communicate, directly or indirectly, with one another (e.g., via one or more buses).

The communications manager 820 may support wireless communication at a first UE in accordance with examples as disclosed herein. The resource component 825 may be configured as or otherwise support a means for receiving control signaling indicating a first set of resources for ROs and a second set of resources for communicating one or more indications of interference associated with the ROs. The signal component 830 may be configured as or otherwise support a means for receiving, from a second UE, a reference signal over at least one resource of the second set of resources. The access component 835 may be configured as or otherwise support a means for performing a RACH procedure during a RO, the RO associated with the at least one resource and is based on a signal parameter associated with the received reference signal satisfying a threshold.

In some examples, to support receiving the control signaling, the resource component 825 may be configured as or otherwise support a means for receiving the control signaling indicating the first set of resources for the ROs being based on a connected mode of the first UE. In some examples, to support receiving the reference signal, the signal component 830 may be configured as or otherwise support a means for receiving an SRS over the at least one resource of the second set of resources for CLI measurement. In some examples, the metric component 840 may be configured as or otherwise support a means for determining a RSSI based on the received SRS over the at least one resource of the second set of resources for the CLI measurement. In some examples, the metric component 840 may be configured as or otherwise support a means for determining whether to use the RO associated with the at least one resource of the second set of resources for the CLI measurement based on the RSSI satisfying the threshold. In some examples, the access component 835 may be configured as or otherwise support a means for performing the RACH procedure further based on determining whether to use the RO.

In some examples, to support receiving the reference signal, the signal component 830 may be configured as or otherwise support a means for receiving the reference signal on each of the second set of resources for communicating the one or more indications of interference, each RO corresponding to a resource of the second set of resources for CLI measurement on each of one or more beams associated with each of one or more ROs, the method further including. In some examples, to support receiving the reference signal, the metric component 840 may be configured as or otherwise support a means for determining a signal strength associated with the received reference signal on each of the second set of resources for CLI measurement. In some examples, to support receiving the reference signal, the report component 845 may be configured as or otherwise support a means for transmitting a report indicating the signal strength associated with the received reference signal on each of the second set of resources for the CLI measurement.

In some examples, the indicator component 850 may be configured as or otherwise support a means for receiving an indication of the RO to use for the RACH procedure based on transmitting the report. In some examples, the access component 835 may be configured as or otherwise support a means for selecting the RO based on the received indication of the RO. In some examples, the report indicates an availability of one or more ROs for the RACH procedure based on the signal strength associated with the received reference signal on each of the second set of resources for the CLI measurement. In some examples, the resource component 825 may be configured as or otherwise support a means for receiving second control signaling indicating a change to a different resource of each of first set of resources for the ROs in a time domain or a frequency domain, or both, based on the report. In some examples, the access component 835 may be configured as or otherwise support a means for performing the RACH procedure further based on the received second control signaling.

In some examples, the control signaling includes a bitmap identifying one or more of the ROs to use for the RACH procedure. In some examples, the control signaling includes an RRC message, a MAC-CE, or DCI. In some examples, each RO corresponding to a resource of the second set of resources for CLI measurement on a beam associated with each RO. In some examples, the first set of resources of the ROs overlaps with a third set of resources for DL communications with the second UE. In some examples, the first set of resources for the ROs are full duplexed with the third set of resources for the DL communications.

Figure 9:
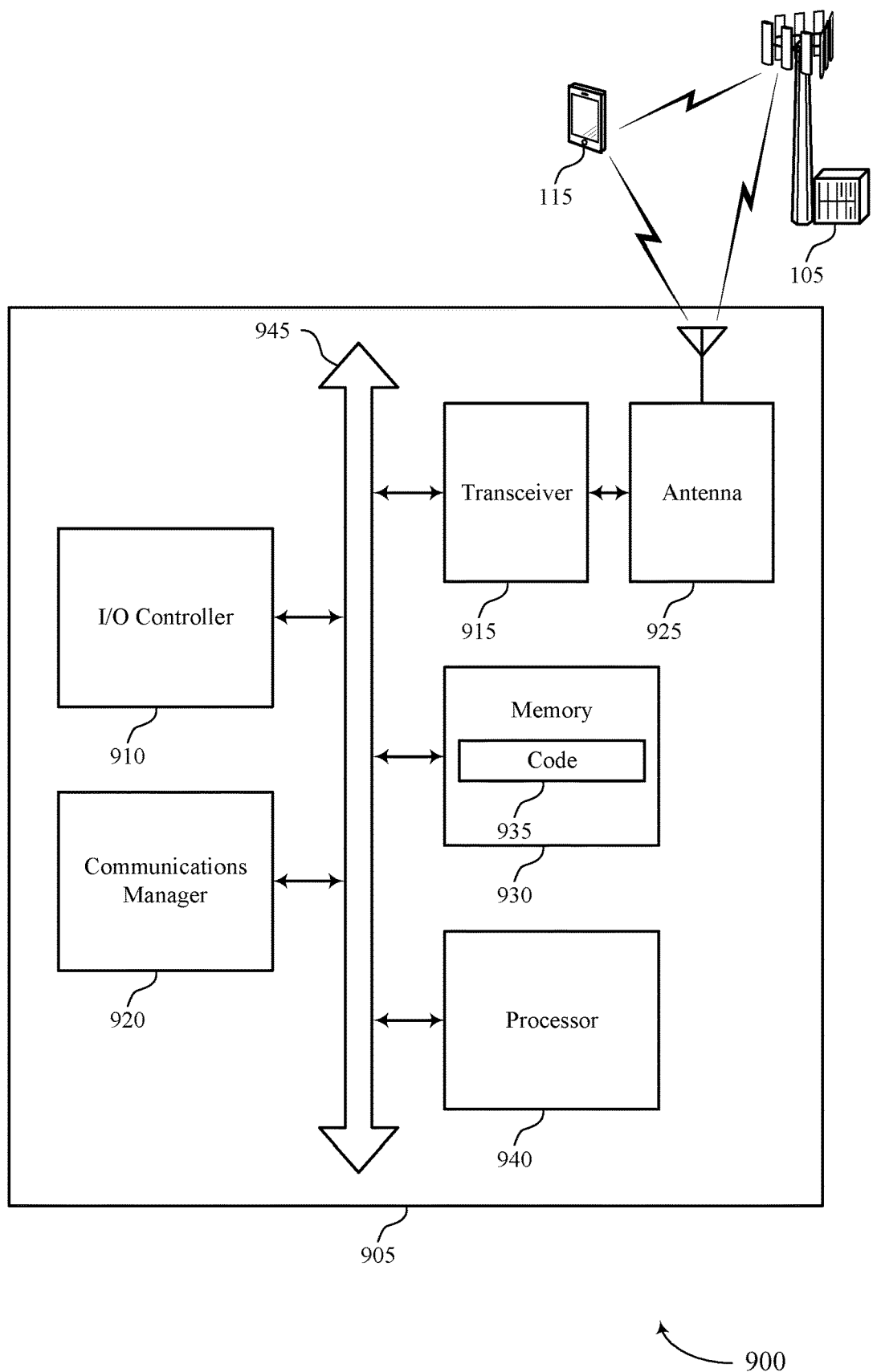
FIG. 9 shows a diagram of a system including a device that supports ROs and resources for interference mitigation in accordance with one or more aspects of the present disclosure.

FIG. 9 shows a diagram of a system 900 including a device 905 that supports ROs and resources for interference mitigation in accordance with one or more aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting ROs and resources for interference mitigation). For example, the device 905 or a component of the device 905 may include a processor 940 and memory 930 coupled to the processor 940, the processor 940 and memory 930 configured to perform various functions described herein.

The communications manager 920 may support wireless communication at the device 905 (e.g., a first UE) in accordance with examples as disclosed herein. For example, the communications manager 920 may be configured as or otherwise support a means for receiving control signaling indicating a first set of resources for ROs and a second set of resources for communicating one or more indications of interference associated with the ROs. The communications manager 920 may be configured as or otherwise support a means for receiving, from a second UE, a reference signal over at least one resource of the second set of resources. The communications manager 920 may be configured as or otherwise support a means for performing a RACH procedure during a RO, the RO associated with the at least one resource and is based on a signal parameter associated with the received reference signal satisfying a threshold. By including or configuring the communications manager 920 in accordance with examples as described herein, the device 905 may support techniques for reduced latency and more efficient utilization of communication resources.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of ROs and resources for interference mitigation as described herein, or the processor 940 and the memory 930 may be otherwise configured to perform or support such operations.

Figure 10:
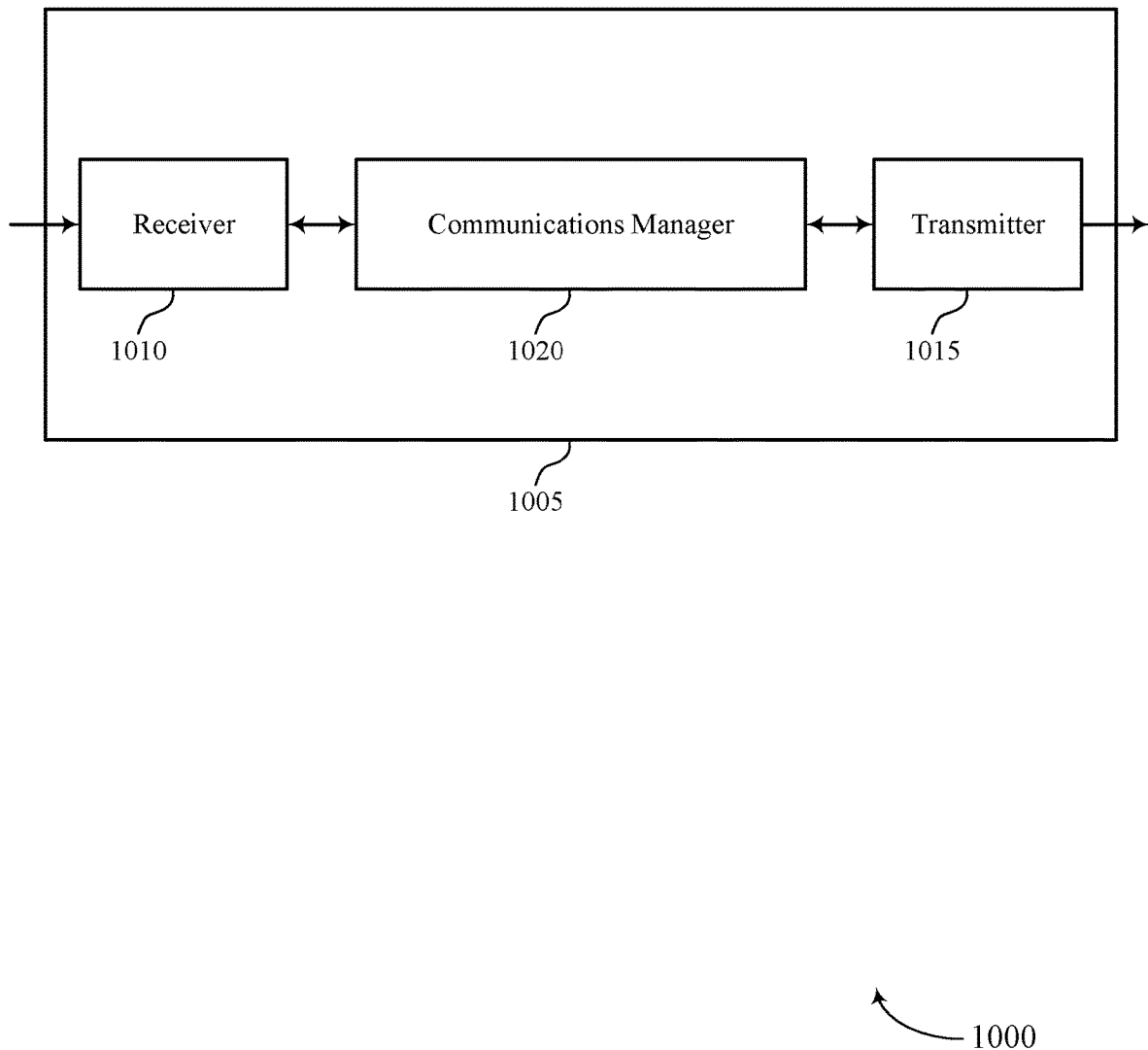
FIGS. 10 and 11 show block diagrams of devices that support ROs and resources for interference mitigation in accordance with one or more aspects of the present disclosure.

FIG. 10 shows a block diagram 1000 of a device 1005 that supports ROs and resources for interference mitigation in accordance with one or more aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to ROs and resources for interference mitigation). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to ROs and resources for interference mitigation). In some examples, the transmitter 1015 may be co-located with a receiver 1010 in a transceiver. The transmitter 1015 may utilize a single antenna or a set of multiple antennas.

The communications manager 1020, the receiver 1010, the transmitter 1015, or various combinations thereof or various components thereof may be examples of means for performing various aspects of ROs and resources for interference mitigation as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support wireless communication at the device 1005 (e.g., a base station) in accordance with examples as disclosed herein. For example, the communications manager 1020 may be configured as or otherwise support a means for transmitting, control signaling indicating a first set of resources for ROs and a second set of resources for communicating one or more indications of interference associated with the ROs, the first set of resources of the ROs overlapping with a third set of resources for DL communications. The communications manager 1020 may be configured as or otherwise support a means for performing a RACH procedure during a RO of the ROs that are fully duplexed with the third set of resources for the DL communications.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for more efficient utilization of communication resources.

Figure 11:
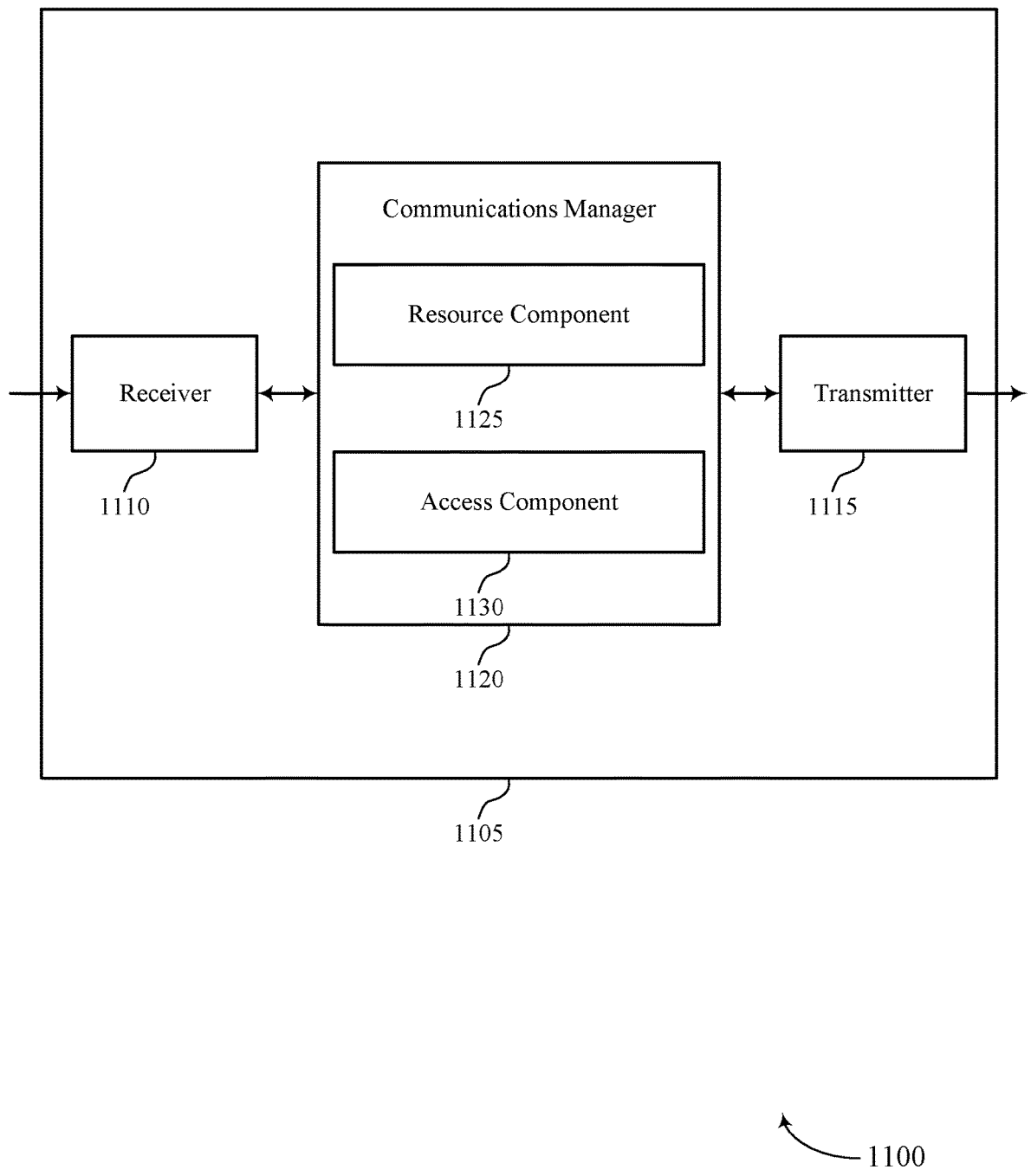

FIG. 11 shows a block diagram 1100 of a device 1105 that supports ROs and resources for interference mitigation in accordance with one or more aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to ROs and resources for interference mitigation). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to ROs and resources for interference mitigation). In some examples, the transmitter 1115 may be co-located with a receiver 1110 in a transceiver. The transmitter 1115 may utilize a single antenna or a set of multiple antennas.

The device 1105, or various components thereof, may be an example of means for performing various aspects of ROs and resources for interference mitigation as described herein. For example, the communications manager 1120 may include a resource component 1125 an access component 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at the device 1105 (e.g., a base station) in accordance with examples as disclosed herein. The resource component 1125 may be configured as or otherwise support a means for transmitting, control signaling indicating a first set of resources for ROs and a second set of resources for communicating one or more indications of interference associated with the ROs, the first set of resources of the ROs overlapping with a third set of resources for DL communications. The access component 1130 may be configured as or otherwise support a means for performing a RACH procedure during a RO of the ROs that are fully duplexed with the third set of resources for the DL communications.

Figure 12:
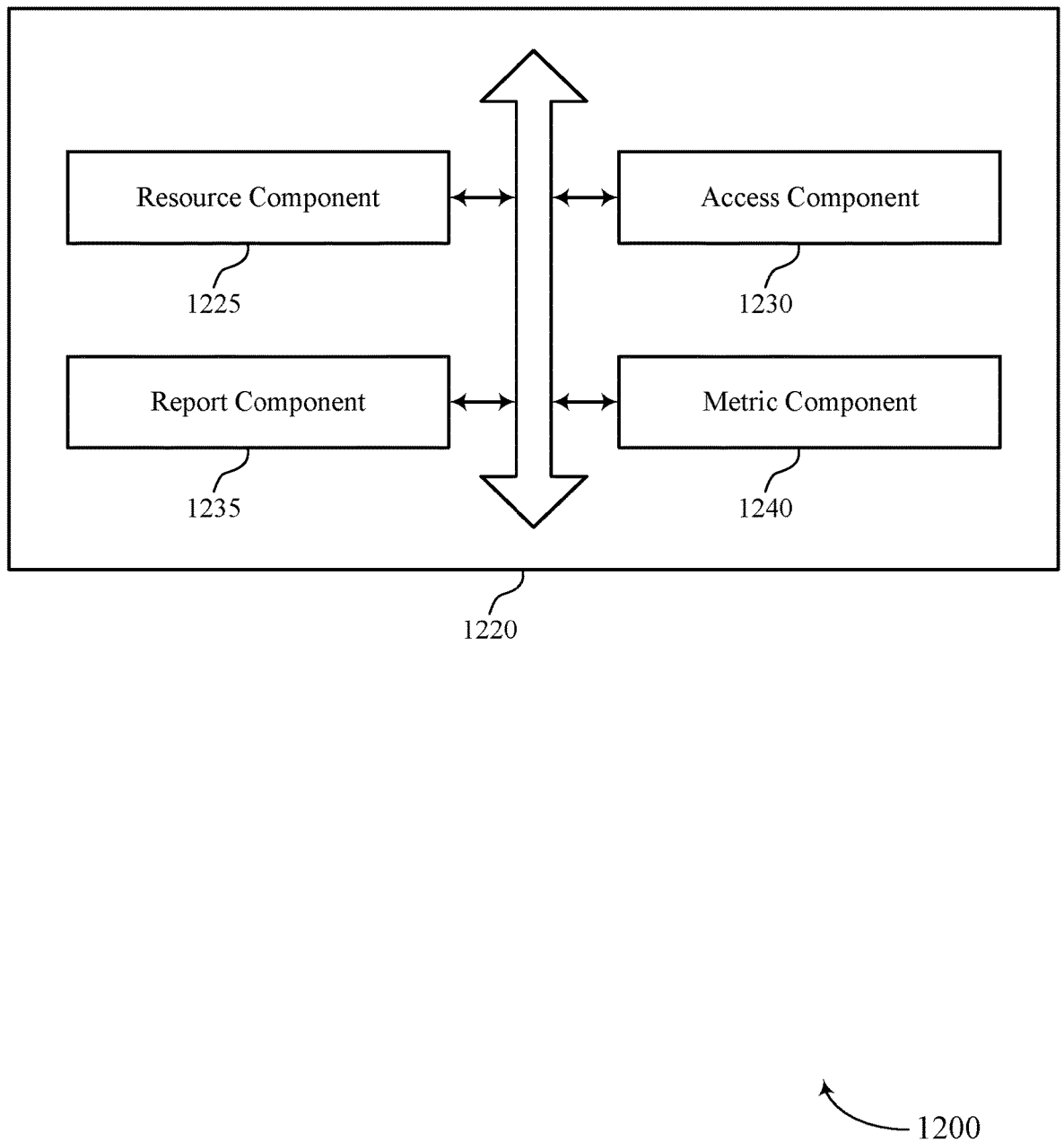
FIG. 12 shows a block diagram of a communications manager that supports ROs and resources for interference mitigation in accordance with one or more aspects of the present disclosure.

FIG. 12 shows a block diagram 1200 of a communications manager 1220 that supports ROs and resources for interference mitigation in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of ROs and resources for interference mitigation as described herein. For example, the communications manager 1220 may include a resource component 1225, an access component 1230, a report component 1235, a metric component 1240, or any combination thereof. Each of these components may communicate, directly or indirectly, with one another (e.g., via one or more buses).

The communications manager 1220 may support wireless communication at a base station in accordance with examples as disclosed herein. The resource component 1225 may be configured as or otherwise support a means for transmitting, control signaling indicating a first set of resources for ROs and a second set of resources for communicating one or more indications of interference associated with the ROs, the first set of resources of the ROs overlapping with a third set of resources for DL communications. The access component 1230 may be configured as or otherwise support a means for performing a RACH procedure during a RO of the ROs that are fully duplexed with the third set of resources for the DL communications.

In some examples, the report component 1235 may be configured as or otherwise support a means for receiving a report indicating a signal strength associated with a reference signal communicated over each resource of the second set of resources for CLI measurement. In some examples, the access component 1230 may be configured as or otherwise support a means for performing the RACH procedure further based on the report. In some examples, the metric component 1240 may be configured as or otherwise support a means for determining whether to use the RO of the ROs for the RACH procedure based on the report. In some examples, the access component 1230 may be configured as or otherwise support a means for performing the RACH procedure further based on determining whether to use the RO.

In some examples, the report indicates an availability of one or more ROs for the RACH procedure based on the signal strength associated with the received reference signal on each of the second set of resources for the CLI measurement. In some examples, the resource component 1225 may be configured as or otherwise support a means for transmitting second control signaling indicating a change to a different resource of each of the first set of resources for the ROs in a time domain or a frequency domain, or both, based on the report. In some examples, the access component 1230 may be configured as or otherwise support a means for performing the RACH procedure further based on the transmitted second control signaling.

In some examples, the resource component 1225 may be configured as or otherwise support a means for allocating, based on the report, a fourth set of resources for half duplex communications or a different set of ROs that are non-overlapping with the third set of resources for the DL communications. In some examples, the control signaling includes a bitmap identifying one or more ROs to use for the RACH procedure. In some examples, the control signaling includes an RRC message, a MAC-CE, or a DCI. In some examples, the first set of resources for the ROs are full duplexed with the third set of resources for the DL communications.

Figure 13:
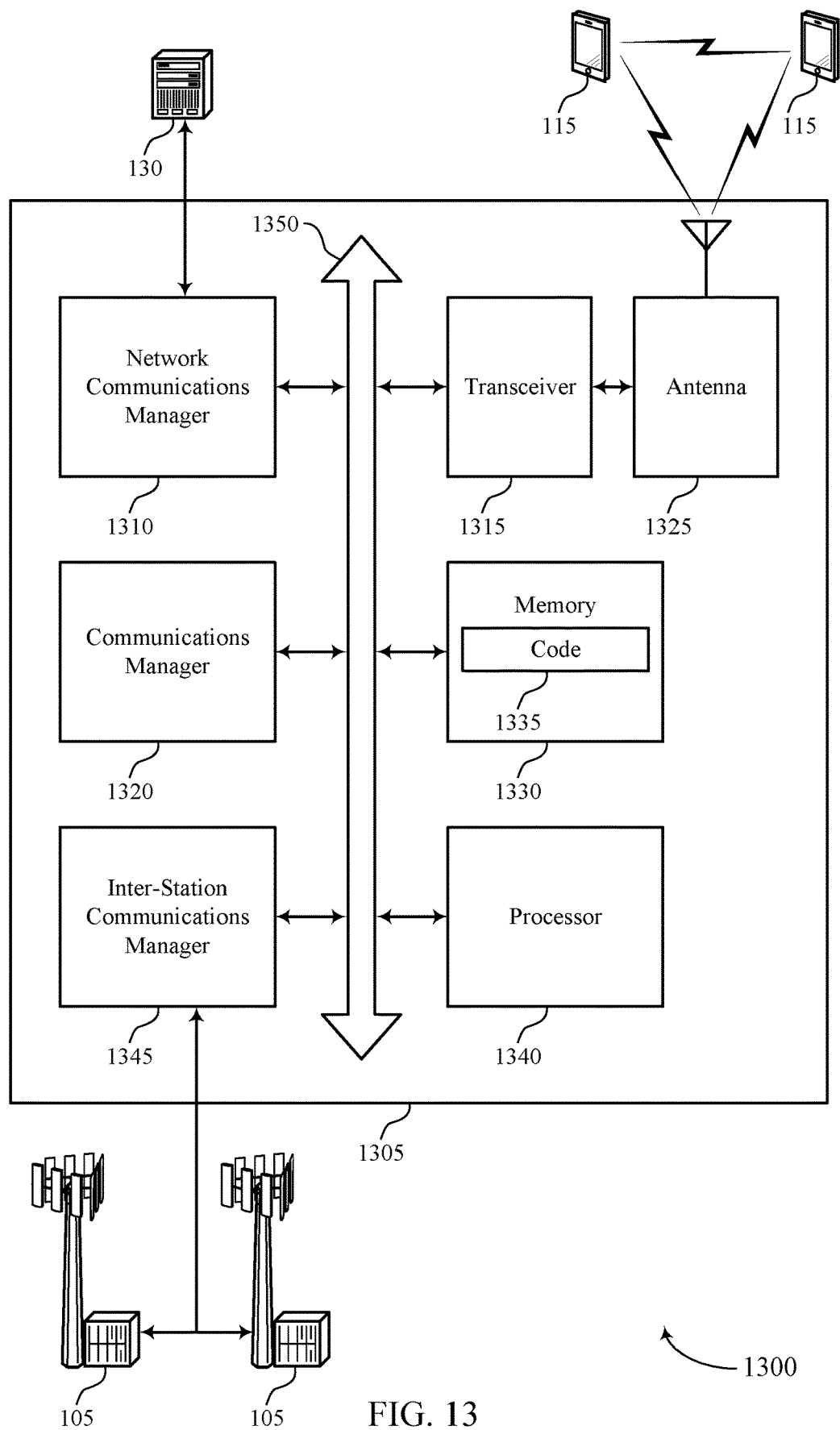
FIG. 13 shows a diagram of a system including a device that supports ROs and resources for interference mitigation in accordance with one or more aspects of the present disclosure.

FIG. 13 shows a diagram of a system 1300 including a device 1305 that supports ROs and resources for interference mitigation in accordance with one or more aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory.

In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g., the memory 1330) to cause the device 1305 to perform various functions (e.g., functions or tasks supporting ROs and resources for interference mitigation). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support wireless communication at the device 1305 (e.g., a base station) in accordance with examples as disclosed herein. For example, the communications manager 1320 may be configured as or otherwise support a means for transmitting, control signaling indicating a first set of resources for ROs and a second set of resources for communicating one or more indications of interference associated with the ROs, the first set of resources of the ROs overlapping with a third set of resources for DL communications. The communications manager 1320 may be configured as or otherwise support a means for performing a RACH procedure during a RO of the ROs that are fully duplexed with the third set of resources for the DL communications. By including or configuring the communications manager 1320 in accordance with examples as described herein, the device 1305 may support techniques for reduced latency and more efficient utilization of communication resources.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of ROs and resources for interference mitigation as described herein, or the processor 1340 and the memory 1330 may be otherwise configured to perform or support such operations.

Figure 14:
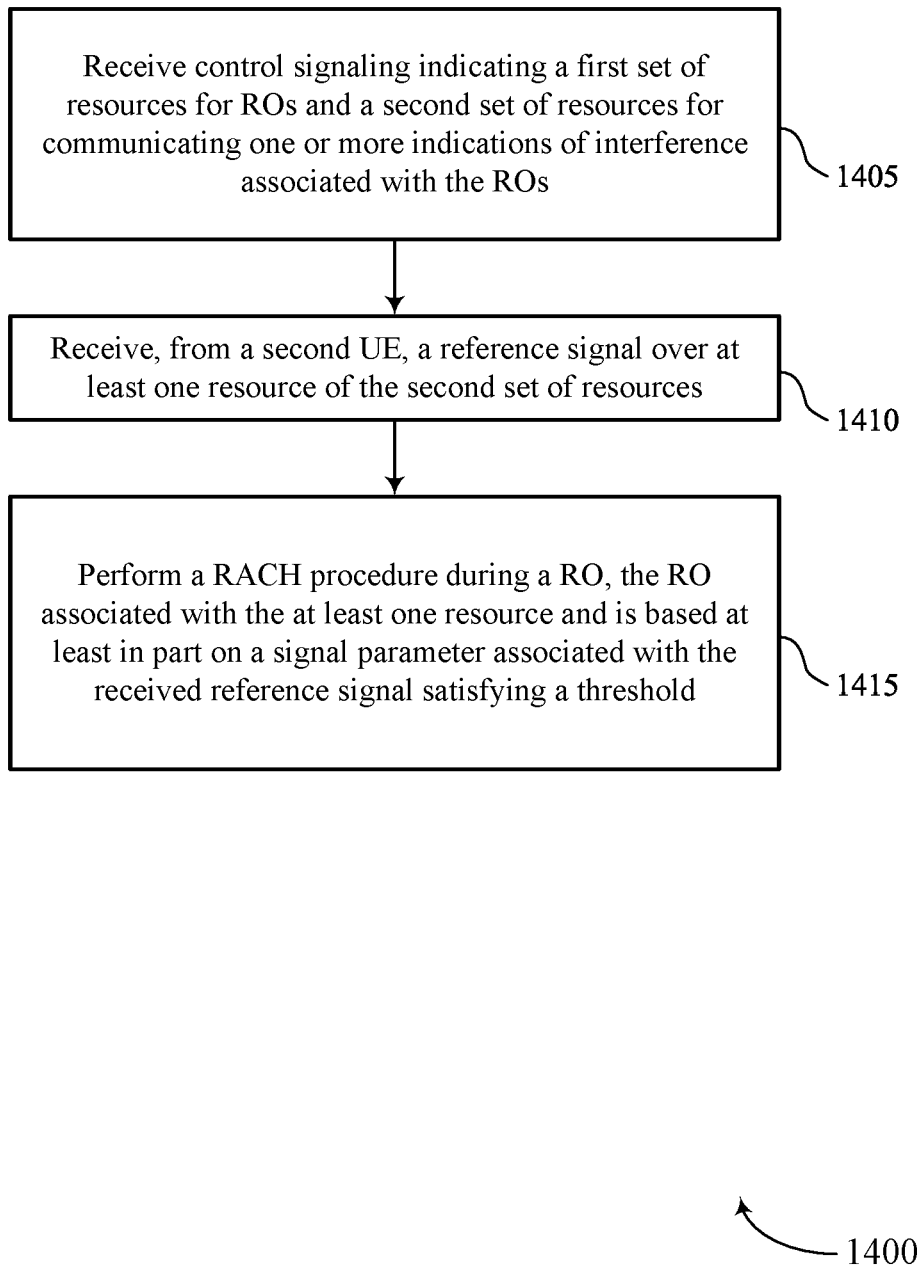
FIGS. 14 through 17 show flowcharts illustrating methods that support ROs and resources for interference mitigation in accordance with one or more aspects of the present disclosure.

FIG. 14 shows a flowchart illustrating a method 1400 that supports ROs and resources for interference mitigation in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, a UE may perform aspects of the described functions using special-purpose hardware.

At 1405, the method may include receiving control signaling indicating a first set of resources for ROs and a second set of resources for communicating one or more indications of interference associated with the ROs. The operations of 1405 may be performed in accordance with examples as disclosed herein. In some examples, aspects of the operations of 1405 may be performed by a resource component 825 as described with reference to FIG. 8.

At 1410, the method may include receiving, from a second UE, a reference signal over at least one resource of the second set of resources. The operations of 1410 may be performed in accordance with examples as disclosed herein. In some examples, aspects of the operations of 1410 may be performed by a signal component 830 as described with reference to FIG. 8.

At 1415, the method may include performing a RACH procedure during a RO, the RO associated with the at least one resource and is based on a signal parameter associated with the received reference signal satisfying a threshold. The operations of 1415 may be performed in accordance with examples as disclosed herein. In some examples, aspects of the operations of 1415 may be performed by an access component 835 as described with reference to FIG. 8.

Figure 15:
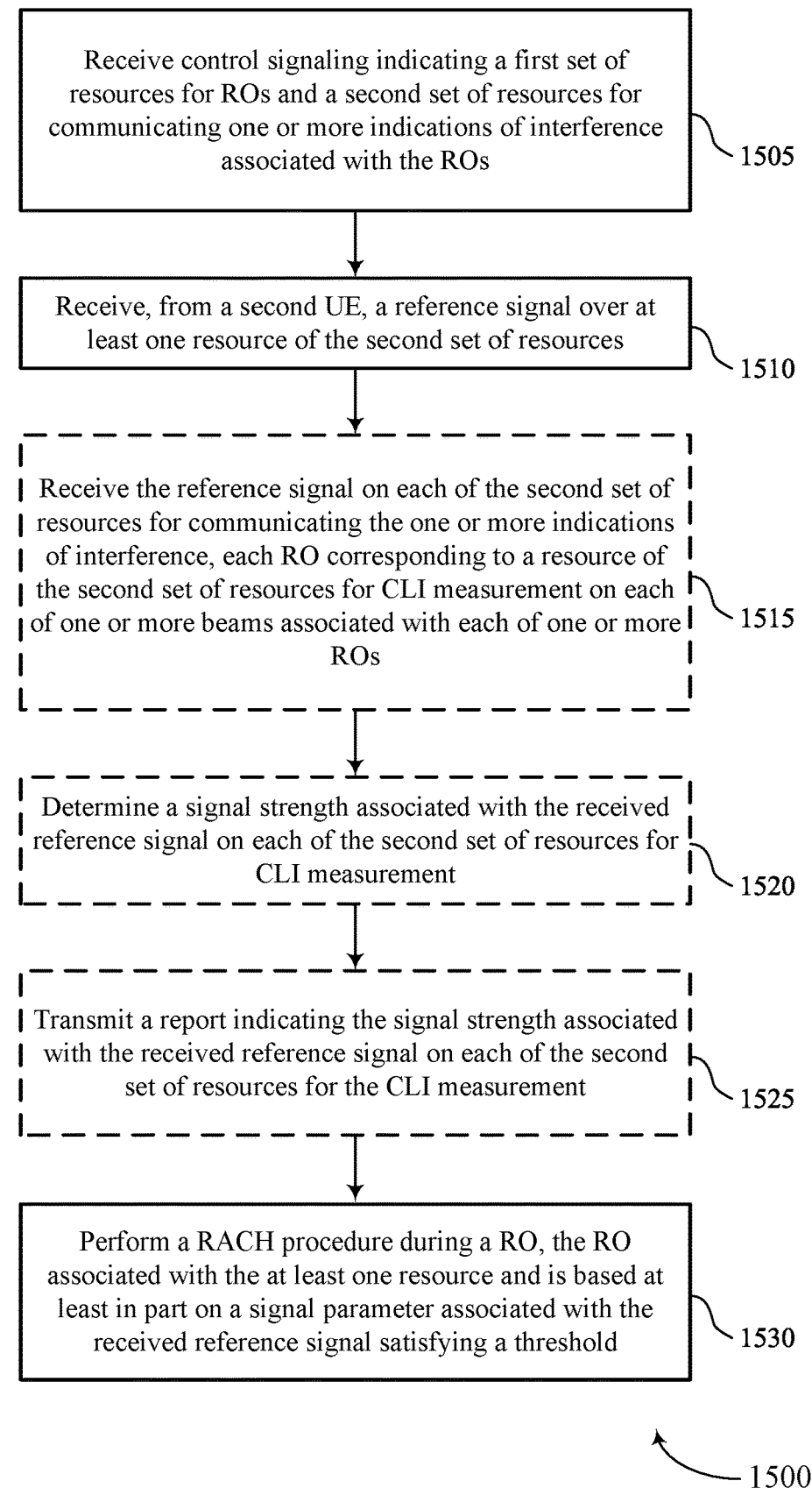

FIG. 15 shows a flowchart illustrating a method 1500 that supports ROs and resources for interference mitigation in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, a UE may perform aspects of the described functions using special-purpose hardware.

At 1505, the method may include receiving control signaling indicating a first set of resources for ROs and a second set of resources for communicating one or more indications of interference associated with the ROs. The operations of 1505 may be performed in accordance with examples as disclosed herein. In some examples, aspects of the operations of 1505 may be performed by a resource component 825 as described with reference to FIG. 8.

At 1510, the method may include receiving, from a second UE, a reference signal over at least one resource of the second set of resources. The operations of 1510 may be performed in accordance with examples as disclosed herein. In some examples, aspects of the operations of 1510 may be performed by a signal component 830 as described with reference to FIG. 8.

At 1515, the method may include receiving the reference signal on each of the second set of resources for communicating the one or more indications of interference, each RO corresponding to a resource of the second set of resources for CLI measurement on each of one or more beams associated with each of one or more ROs. The operations of 1515 may be performed in accordance with examples as disclosed herein. In some examples, aspects of the operations of 1515 may be performed by a signal component 830 as described with reference to FIG. 8.

At 1520, the method may include determining a signal strength associated with the received reference signal on each of the second set of resources for CLI measurement. The operations of 1520 may be performed in accordance with examples as disclosed herein. In some examples, aspects of the operations of 1520 may be performed by a metric component 840 as described with reference to FIG. 8.

At 1525, the method may include transmitting a report indicating the signal strength associated with the received reference signal on each of the second set of resources for the CLI measurement. The operations of 1525 may be performed in accordance with examples as disclosed herein. In some examples, aspects of the operations of 1525 may be performed by a report component 845 as described with reference to FIG. 8.

At 1530, the method may include performing a RACH procedure during a RO, the RO associated with the at least one resource and is based on a signal parameter associated with the received reference signal satisfying a threshold. The operations of 1530 may be performed in accordance with examples as disclosed herein. In some examples, aspects of the operations of 1530 may be performed by an access component 835 as described with reference to FIG. 8.

Figure 16:
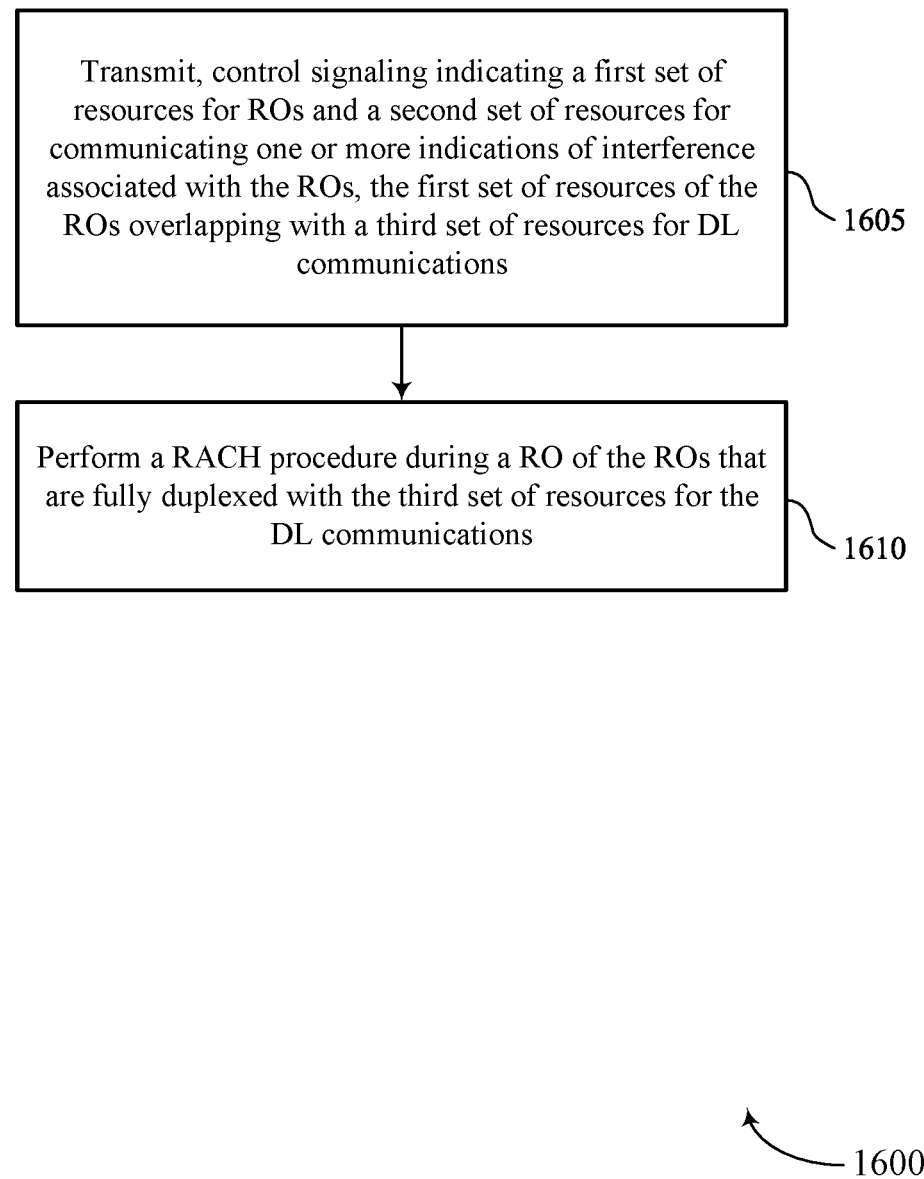

FIG. 16 shows a flowchart illustrating a method 1600 that supports ROs and resources for interference mitigation in accordance with one or more aspects of the present disclosure. The operations of the method 1600 may be implemented by a base station or its components as described herein. For example, the operations of the method 1600 may be performed by a base station 105 as described with reference to FIGS. 1 through 5 and 10 through 13. In some examples, a base station may execute a set of instructions to control the functional elements of the base station to perform the described functions. Additionally or alternatively, a base station may perform aspects of the described functions using special-purpose hardware.

At 1605, the method may include transmitting, control signaling indicating a first set of resources for ROs and a second set of resources for communicating one or more indications of interference associated with the ROs, the first set of resources of the ROs overlapping with a third set of resources for DL communications. The operations of 1605 may be performed in accordance with examples as disclosed herein. In some examples, aspects of the operations of 1605 may be performed by a resource component 1225 as described with reference to FIG. 12.

At 1610, the method may include performing a RACH procedure during a RO of the ROs that are fully duplexed with the third set of resources for the DL communications. The operations of 1610 may be performed in accordance with examples as disclosed herein. In some examples, aspects of the operations of 1610 may be performed by an access component 1230 as described with reference to FIG. 12.

Figure 17:
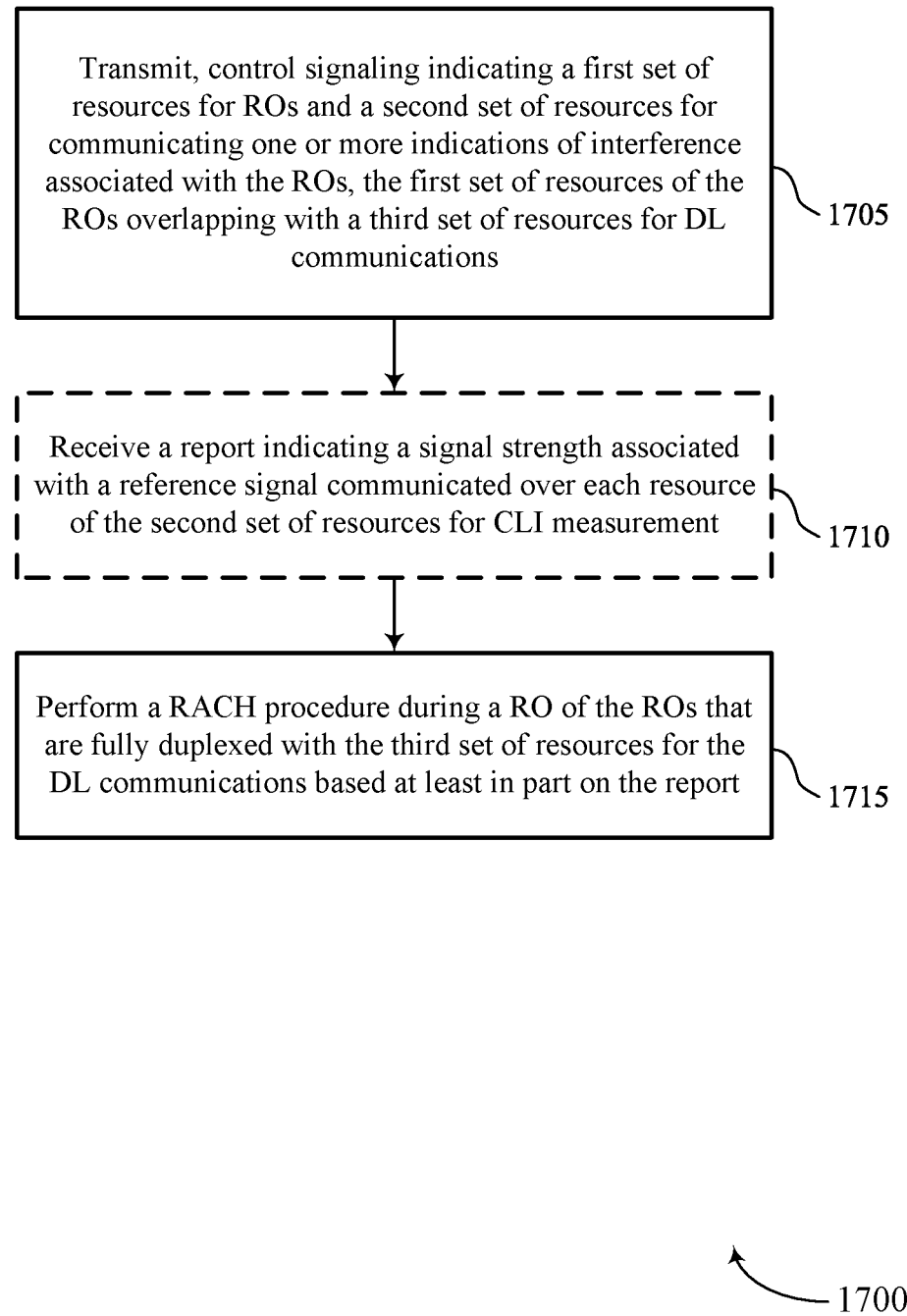

FIG. 17 shows a flowchart illustrating a method 1700 that supports ROs and resources for interference mitigation in accordance with one or more aspects of the present disclosure. The operations of the method 1700 may be implemented by a base station or its components as described herein. For example, the operations of the method 1700 may be performed by a base station as described with reference to FIGS. 1 through 5 and 10 through 13. In some examples, a base station may execute a set of instructions to control the functional elements of the base station to perform the described functions. Additionally or alternatively, a base station may perform aspects of the described functions using special-purpose hardware.

At 1705, the method may include transmitting, control signaling indicating a first set of resources for ROs and a second set of resources for communicating one or more indications of interference associated with the ROs, the first set of resources of the ROs overlapping with a third set of resources for DL communications. The operations of 1705 may be performed in accordance with examples as disclosed herein. In some examples, aspects of the operations of 1705 may be performed by a resource component 1225 as described with reference to FIG. 12.

At 1710, the method may include receiving a report indicating a signal strength associated with a reference signal communicated over each resource of the second set of resources for CLI measurement. The operations of 1710 may be performed in accordance with examples as disclosed herein. In some examples, aspects of the operations of 1710 may be performed by a report component 1235 as described with reference to FIG. 12.

At 1715, the method may include performing a RACH procedure during a RO of the ROs that are fully duplexed with the third set of resources for the DL communications based on the report. The operations of 1715 may be performed in accordance with examples as disclosed herein. In some examples, aspects of the operations of 1715 may be performed by an access component 1230 as described with reference to FIG. 12.

The following provides an overview of aspects of the present disclosure:

Aspect 1: A method for wireless communication at a first UE, comprising: receiving control signaling indicating a first set of resources for ROs and a second set of resources for communicating one or more indications of interference associated with the ROs; receiving, from a second UE, a reference signal over at least one resource of the second set of resources; and performing a RACH procedure during a RO, the RO associated with the at least one resource and is based at least in part on a signal parameter associated with the received reference signal satisfying a threshold.

Aspect 2: The method of aspect 1, wherein receiving the control signaling comprises: receiving the control signaling indicating the first set of resources for the ROs being based at least in part on a connected mode of the first UE.

Aspect 3: The method of any of aspects 1 through 2, wherein receiving the reference signal comprises: receiving a SRS over the at least one resource of the second set of resources for CLI measurement.

Aspect 4: The method of aspect 3, further comprising: determining a RSSI based at least in part on the received SRS over the at least one resource of the second set of resources for the CLI measurement; and determining whether to use the RO associated with the at least one resource of the second set of resources for the CLI measurement based at least in part on the RSSI satisfying the threshold, wherein performing the RACH procedure is further based at least in part on determining whether to use the RO.

Aspect 5: The method of any of aspects 1 through 4, wherein receiving the reference signal comprises: receiving the reference signal on each of the second set of resources for communicating the one or more indications of interference, each RO corresponding to a resource of the second set of resources for CLI measurement on each of one or more beams associated with each of one or more ROs, the method further comprising: determining a signal strength associated with the received reference signal on each of the second set of resources for CLI measurement; and transmitting a report indicating the signal strength associated with the received reference signal on each of the second set of resources for the CLI measurement.

Aspect 6: The method of aspect 5, further comprising: receiving an indication of the RO to use for the RACH procedure based at least in part on transmitting the report; and selecting the RO based at least in part on the received indication of the RO.

Aspect 7: The method of any of aspects 5 through 6, wherein the report indicates an availability of one or more ROs for the RACH procedure based at least in part on the signal strength associated with the received reference signal on each of the second set of resources for the CLI measurement.

Aspect 8: The method of any of aspects 5 through 7, further comprising: receiving second control signaling indicating a change to a different resource of each of first set of resources for the ROs in a time domain or a frequency domain, or both, based at least in part on the report, wherein performing the RACH procedure is further based at least in part on the received second control signaling.

Aspect 9: The method of any of aspects 1 through 8, wherein the control signaling comprises a bitmap identifying one or more of the ROs to use for the RACH procedure.

Aspect 10: The method of aspect 9, wherein the control signaling comprises a RRC message, a MAC-CE, or a DCI.

Aspect 11: The method of any of aspects 1 through 10, wherein each RO corresponding to a resource of the second set of resources for CLI measurement on a beam associated with each RO.

Aspect 12: The method of any of aspects 1 through 11, wherein the first set of resources of the ROs overlaps with a third set of resources for downlink communications with the second UE, and the first set of resources for the ROs are full duplexed with the third set of resources for the downlink communications.

Aspect 13: A method for wireless communication at a base station, comprising: transmitting, control signaling indicating a first set of resources for ROs and a second set of resources for communicating one or more indications of interference associated with the ROs, the first set of resources of the ROs overlapping with a third set of resources for downlink communications; and performing a RACH procedure during a RO of the ROs that are fully duplexed with the third set of resources for the downlink communications.

Aspect 14: The method of aspect 13, further comprising: receiving a report indicating a signal strength associated with a reference signal communicated over each resource of the second set of resources for CLI measurement, wherein performing the RACH procedure is further based at least in part on the report.

Aspect 15: The method of aspect 14, further comprising: determining whether to use the RO of the ROs for the RACH procedure based at least in part on the report, wherein performing the RACH procedure is further based at least in part on determining whether to use the RO.

Aspect 16: The method of any of aspects 14 through 15, wherein the report indicates an availability of one or more ROs for the RACH procedure based at least in part on the signal strength associated with the received reference signal on each of the second set of resources for the CLI measurement.

Aspect 17: The method of any of aspects 14 through 16, further comprising: transmitting second control signaling indicating a change to a different resource of each of the first set of resources for the ROs in a time domain or a frequency domain, or both, based at least in part on the report, wherein performing the RACH procedure is further based at least in part on the transmitted second control signaling.

Aspect 18: The method of any of aspects 14 through 17, further comprising: allocating, based at least in part on the report, a fourth set of resources for half duplex communications or a different set of ROs that are non-overlapping with the third set of resources for the downlink communications.

Aspect 19: The method of any of aspects 13 through 18, wherein the control signaling comprises a bitmap identifying one or more ROs to use for the RACH procedure.

Aspect 20: The method of any of aspects 13 through 19, wherein the control signaling comprises a RRC message, a MAC-CE, or a DCI.

Aspect 21: The method of any of aspects 13 through 20, wherein the first set of resources for the ROs are full duplexed with the third set of resources for the downlink communications.

Aspect 22: An apparatus for wireless communication, comprising a processor; memory coupled to the processor, the processor and memory configured to perform a method of any of aspects 1 through 12.

Aspect 23: An apparatus for wireless communication, comprising at least one means for performing a method of any of aspects 1 through 12.

Aspect 24: A non-transitory computer-readable medium storing code for wireless communication at a first UE, the code comprising instructions executable by a processor to perform a method of any of aspects 1 through 12.

Aspect 25: An apparatus for wireless communication, comprising a processor; memory coupled to the processor, the processor and memory configured to perform a method of any of aspects 13 through 21.

Aspect 26: An apparatus for wireless communication, comprising at least one means for performing a method of any of aspects 13 through 21.

Aspect 27: A non-transitory computer-readable medium storing code for wireless communication at a base station, the code comprising instructions executable by a processor to perform a method of any of aspects 13 through 21.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a user equipment (UE), comprising:
   one or more memories; and
   one or more processors coupled with the one or more memories and configured to cause the UE to:
      receive a control signal that indicates a first set of resources for random access channel occasions and a second set of resources for communication of one or more indications of interference associated with the random access channel occasions;
      receive a reference signal over at least one resource of the second set of resources; and
      perform a random access channel procedure within a random access channel occasion of the first set of resources for random access channel occasions, wherein the random access channel occasion is associated with the at least one resource of the second set of resources and wherein the random access channel occasion is based at least in part on satisfaction of a threshold by a signal parameter associated with the received reference signal.

2. The apparatus of claim 1, wherein, to receive the control signal, the one or more processors are configured to cause the UE to:
receive the control signal that indicates the first set of resources for the random access channel occasions based at least in part on a connected mode of the apparatus.

3. The apparatus of claim 1, wherein, to receive the reference signal, the one or more processors are configured to cause the UE to:
receive a sounding reference signal over the at least one resource of the second set of resources for cross-link interference measurement.

4. The apparatus of claim 3, wherein the one or more processors are further configured to cause the UE to:
determine a received signal strength indicator based at least in part on the received sounding reference signal over the at least one resource of the second set of resources for the cross-link interference measurement; and
determine whether to use the random access channel occasion associated with the at least one resource of the second set of resources for the cross-link interference measurement based at least in part on the satisfaction of the threshold by the received signal strength indicator,
wherein the random access channel procedure is performed based at least in part on whether to use the random access channel occasion.

5. The apparatus of claim 1, wherein, to receive the reference signal, the one or more processors are configured to cause the UE to:
receive the reference signal on each of the second set of resources for the communication of the one or more indications of interference, wherein each of the random access channel occasions is associated with a resource of the second set of resources for cross-link interference measurement on each of one or more beams associated with each of one or more of the random access channel occasions;
determine a signal strength associated with the received reference signal on each of the second set of resources for the cross-link interference measurement; and
transmit a report indicative of the signal strength associated with the received reference signal on each of the second set of resources for the cross-link interference measurement.

6. The apparatus of claim 5, wherein the one or more processors are further configured to cause the UE to:
receive an indication of the random access channel occasion to use for the random access channel procedure based at least in part on transmission of the report; and
select the random access channel occasion based at least in part on the received indication of the random access channel occasion.

7. The apparatus of claim 5, wherein the report indicates an availability of one or more random access channel occasions for the random access channel procedure based at least in part on the signal strength associated with the received reference signal on each of the second set of resources for the cross-link interference measurement.

8. The apparatus of claim 5, wherein the one or more processors are further configured to cause the UE to:
receive a second control signal that indicates a change to a different resource of each of the first set of resources for the random access channel occasions in a time domain or a frequency domain, or both, based at least in part on the report,
wherein the random access channel procedure is performed based at least in part on the received second control signal.

9. The apparatus of claim 1, wherein the control signal comprises a bitmap that identifies one or more of the random access channel occasions to use for the random access channel procedure.

10. The apparatus of claim 9, wherein the control signal comprises a radio resource control message, a medium access control-control element (MAC-CE), or a downlink control information.

11. The apparatus of claim 1, wherein each of the random access channel occasions corresponds to a resource of the second set of resources for cross-link interference measurement on a beam associated with each of the random access channel occasions.

12. The apparatus of claim 1, wherein:
the first set of resources of the random access channel occasions overlaps with a third set of resources for downlink communications with a second UE, and
the first set of resources for the random access channel occasions are full duplexed with the third set of resources for the downlink communications.

13. An apparatus for wireless communication at a network entity, comprising:
one or more memories; and
one or more processors coupled with the one or more memories and configured to cause the network entity to:
transmit, a control signal that indicates a first set of resources for random access channel occasions and a second set of resources for communication of one or more indications of interference associated with the random access channel occasions, wherein the first set of resources of the random access channel occasions that overlap with a third set of resources for downlink communications; and
perform a random access channel procedure within a random access channel occasion of the random access channel occasions that are fully duplexed with the third set of resources for the downlink communications.

14. The apparatus of claim 13, wherein the one or more processors are further configured to cause the network entity to:
receive a report that indicates a signal strength associated with a reference signal communicated over each resource of the second set of resources for cross-link interference measurement,
wherein the random access channel procedure is performed based at least in part on the report.

15. The apparatus of claim 14, wherein the one or more processors are further configured to cause the network entity to:
determine whether to use the random access channel occasion of the random access channel occasions for the random access channel procedure based at least in part on the report, wherein the random access channel procedure is performed based at least in part on whether to use the random access channel occasion.

16. The apparatus of claim 14, wherein the report indicates an availability of one or more random access channel occasions for the random access channel procedure based at least in part on the signal strength associated with the reference signal on each of the second set of resources for the cross-link interference measurement.

17. The apparatus of claim 14, wherein the one or more processors are further configured to cause the network entity to:
transmit a second control signal that indicates a change to a different resource of each of the first set of resources for the random access channel occasions in a time domain or a frequency domain, or both, based at least in part on the report,
wherein the random access channel procedure is performed based at least in part on the transmitted second control signal.

18. The apparatus of claim 14, wherein the one or more processors are further configured to cause the network entity to:
allocate, based at least in part on the report, a fourth set of resources for half duplex communications or a different set of random access channel occasions that do not overlap with the third set of resources for the downlink communications.

19. The apparatus of claim 13, wherein the control signal comprises a bitmap that identifies one or more random access channel occasions to use for the random access channel procedure.

20. The apparatus of claim 13, wherein the control signal comprises a radio resource control message, a medium access control-control element (MAC-CE), or a downlink control information.

21. The apparatus of claim 13, wherein the first set of resources for the random access channel occasions are full duplexed with the third set of resources for the downlink communications.

22. A method for wireless communication at a user equipment (UE), comprising:
receiving a control signaling indicating a first set of resources for random access channel occasions and a second set of resources for communication of one or more indications of interference associated with the random access channel occasions;
receiving a reference signal over at least one resource of the second set of resources; and
performing a random access channel procedure within a random access channel occasion of the first set of resources for random access, wherein the random access channel occasion is associated with the at least one resource of the second set of resources and wherein the random access channel occasion is based at least in part on satisfaction of a threshold by a signal parameter associated with the received reference signal.

23. The method of claim 22, wherein receiving the control signaling comprises:
receiving the control signaling indicating the first set of resources for the random access channel occasions being based at least in part on a connected mode of the UE.

24. The method of claim 22, wherein receiving the reference signal comprises:
receiving a sounding reference signal over the at least one resource of the second set of resources for cross-link interference measurement.

25. The method of claim 24, further comprising:
determining a received signal strength indicator based at least in part on the received sounding reference signal over the at least one resource of the second set of resources for the cross-link interference measurement; and
determining whether to use the random access channel occasion associated with the at least one resource of the second set of resources for the cross-link interference measurement based at least in part on the satisfaction of the threshold by the received signal strength indicator,
wherein performing the random access channel procedure is further based at least in part on determining whether to use the random access channel occasion.

26. The method of claim 22, wherein receiving the reference signal comprises:
receiving the reference signal on each of the second set of resources for the communication of the one or more indications of interference, wherein each random channel access occasion corresponds to a resource of the second set of resources for cross-link interference measurement on each of one or more beams associated with each of one or more random channel access occasions, the method further comprising:
determining a signal strength associated with the received reference signal on each of the second set of resources for the cross-link interference measurement; and
transmitting a report that indicates the signal strength associated with the received reference signal on each of the second set of resources for the cross-link interference measurement.

27. A method for wireless communication at a network entity, comprising:
transmitting, a control signaling indicating a first set of resources for random access channel occasions and a second set of resources for communication of one or more indications of interference associated with the random access channel occasions, wherein the first set of resources of the random access channel occasions overlapping with a third set of resources for downlink communications; and
performing a random access channel procedure within a random access channel occasion of the random access channel occasions that are fully duplexed with the third set of resources for the downlink communications.

28. The method of claim 27, further comprising:
receiving a report that indicates a signal strength associated with a reference signal communicated over each resource of the second set of resources for cross-link interference measurement,
wherein performing the random access channel procedure is further based at least in part on the report.

29. The method of claim 28, further comprising:
determining whether to use the random access channel occasion of the random access channel occasions for the random access channel procedure based at least in part on the report,
wherein performing the random access channel procedure is further based at least in part on determining whether to use the random access channel occasion.

30. The method of claim 28, wherein the report indicates an availability of one or more random access channel occasions for the random access channel procedure based at least in part on the signal strength associated with the reference signal on each of the second set of resources for the cross-link interference measurement.

31. A non-transitory computer-readable medium storing code for wireless at a user equipment (UE), the code comprising instructions executable by one or more processors to cause the UE to:
receive a control signal that indicates a first set of resources for random access channel occasions and a second set of resources for communication of one or more indications of interference associated with the random access channel occasions;
receive a reference signal over at least one resource of the second set of resources; and
perform a random access channel procedure within a random access channel occasion of the first set of resources for random access, wherein the random access channel occasion is associated with the at least one resource of the second set of resources and wherein the random access channel occasion is based at least in part on satisfaction of a threshold by a signal parameter associated with the received reference signal.

32. A non-transitory computer-readable medium storing code for wireless at a network entity, the code comprising instructions executable by one or more processors to cause the network entity to:
transmit, a control signal that indicates a first set of resources for random access channel occasions and a second set of resources for communication of one or more indications of interference associated with the random access channel occasions, wherein the first set of resources of the random access channel occasions overlap with a third set of resources for downlink communications; and
perform a random access channel procedure within a random access channel occasion of the random access channel occasions that are fully duplexed with the third set of resources for the downlink communications.

* * * * *